United States Patent [19]

Riera et al.

[11] Patent Number: 5,016,507
[45] Date of Patent: May 21, 1991

[54] APPARATUS FOR SEVERING A TUBULAR WORKPIECE

[76] Inventors: John F. Riera, 3689 Sandburg Dr., Troy, Mich. 48084; Billy J. Bielawski, Sr., 2270 Flanders Dr., Rochester Hills; John J. Pavelec, 413 Dalton, Rochester, both of Mich. 48063

[21] Appl. No.: 222,947

[22] Filed: Jul. 22, 1988

[51] Int. Cl.⁵ ............................................. B23D 21/00
[52] U.S. Cl. ..................................... 83/384; 83/319; 83/698
[58] Field of Search ................. 83/698, 384, 319, 668, 83/54

[56] References Cited

U.S. PATENT DOCUMENTS

| | | | |
|---|---|---|---|
| 3,273,433 | 9/1966 | Borzym | 83/54 |
| 3,288,011 | 11/1966 | Borzym | 83/310 |
| 3,288,012 | 11/1966 | Borzym | 83/310 |
| 4,294,147 | 10/1981 | Borzym | 83/382 |
| 4,563,927 | 1/1986 | Kinsley | 83/319 |
| 4,646,601 | 4/1987 | Borzym | 83/385 |
| 4,653,368 | 3/1987 | Riera et al. | 83/319 |
| 4,694,718 | 9/1987 | Kinsley | 83/319 |
| 4,766,792 | 8/1988 | Borzym et al. | 83/319 |
| 4,872,384 | 10/1989 | Borzym | 83/454 |
| 4,909,110 | 3/1990 | Borzym | 83/319 |

Primary Examiner—Douglas D. Watts
Assistant Examiner—John M. Husar
Attorney, Agent, or Firm—Harness, Dickey & Pierce

[57] ABSTRACT

A tube cut-off die set includes a compliant cam driver received in a jaw carrying cartridge each adapted to be removably mounted to a die shoe as a separate unit or kit, horizontally and vertically driven tube notching and severing blades which pass through the jaws with the notching blade extending from a cross slide which moves horizontally and has its opposite ends secured during the notching movement, and guide posts having the forward ends of guide bushings rigidified to form a box-like structure to shoulder loads during tube severing. Positioning of a cam drive plate so that a cam slot therein drives the notching blades horizontally when the slot is at its lowest position transfers notching forces to the tube.

41 Claims, 16 Drawing Sheets

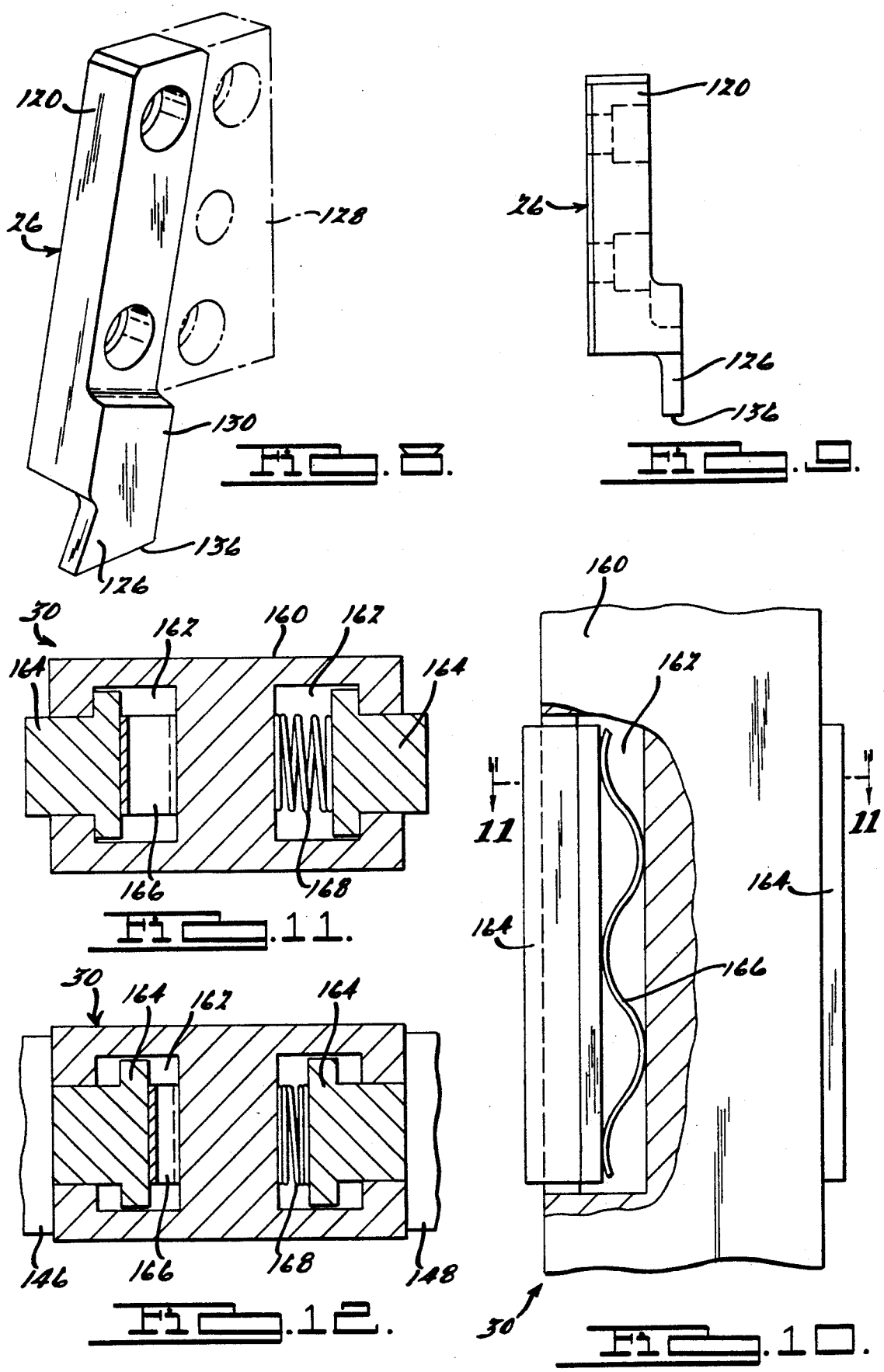

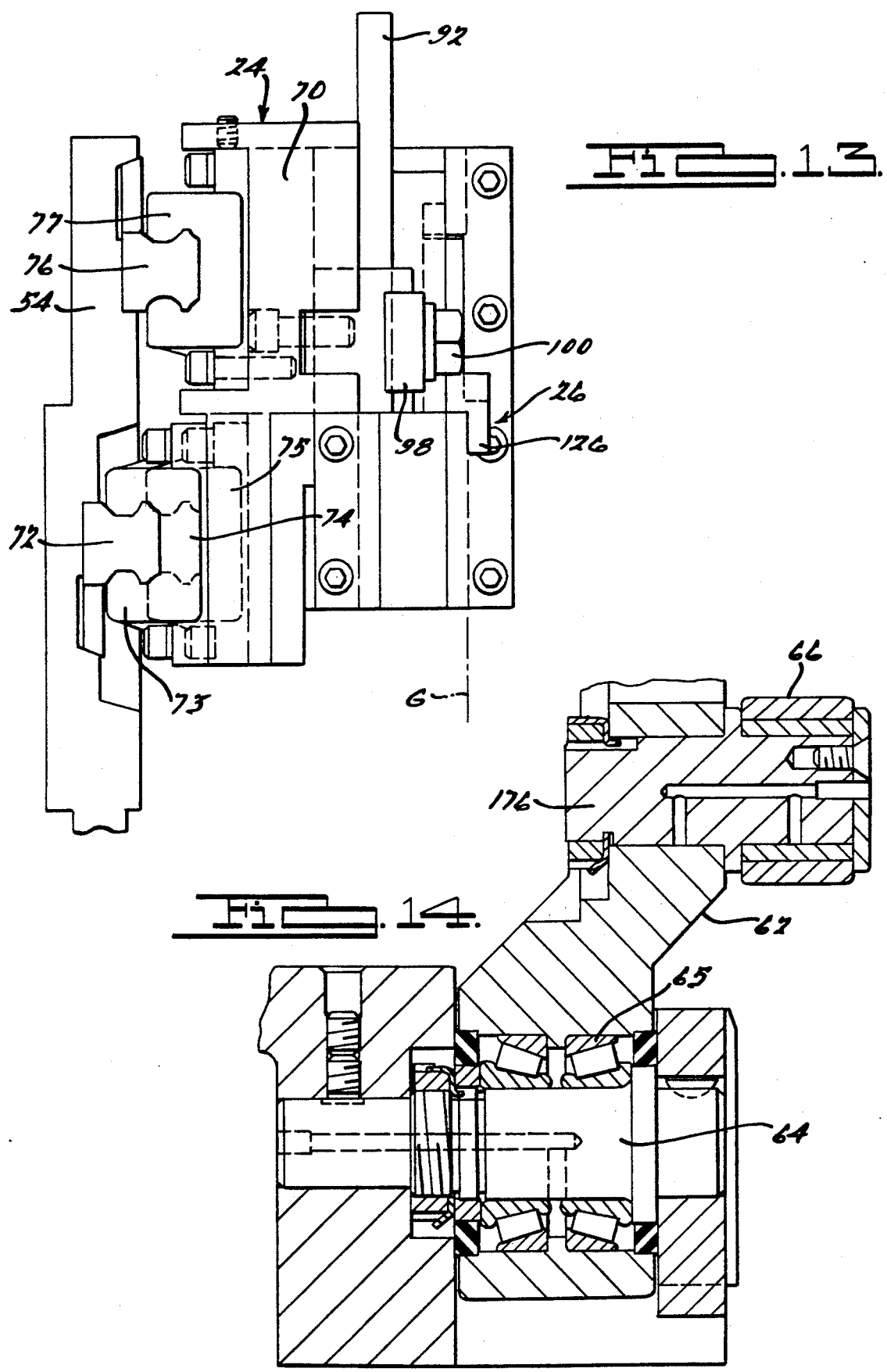

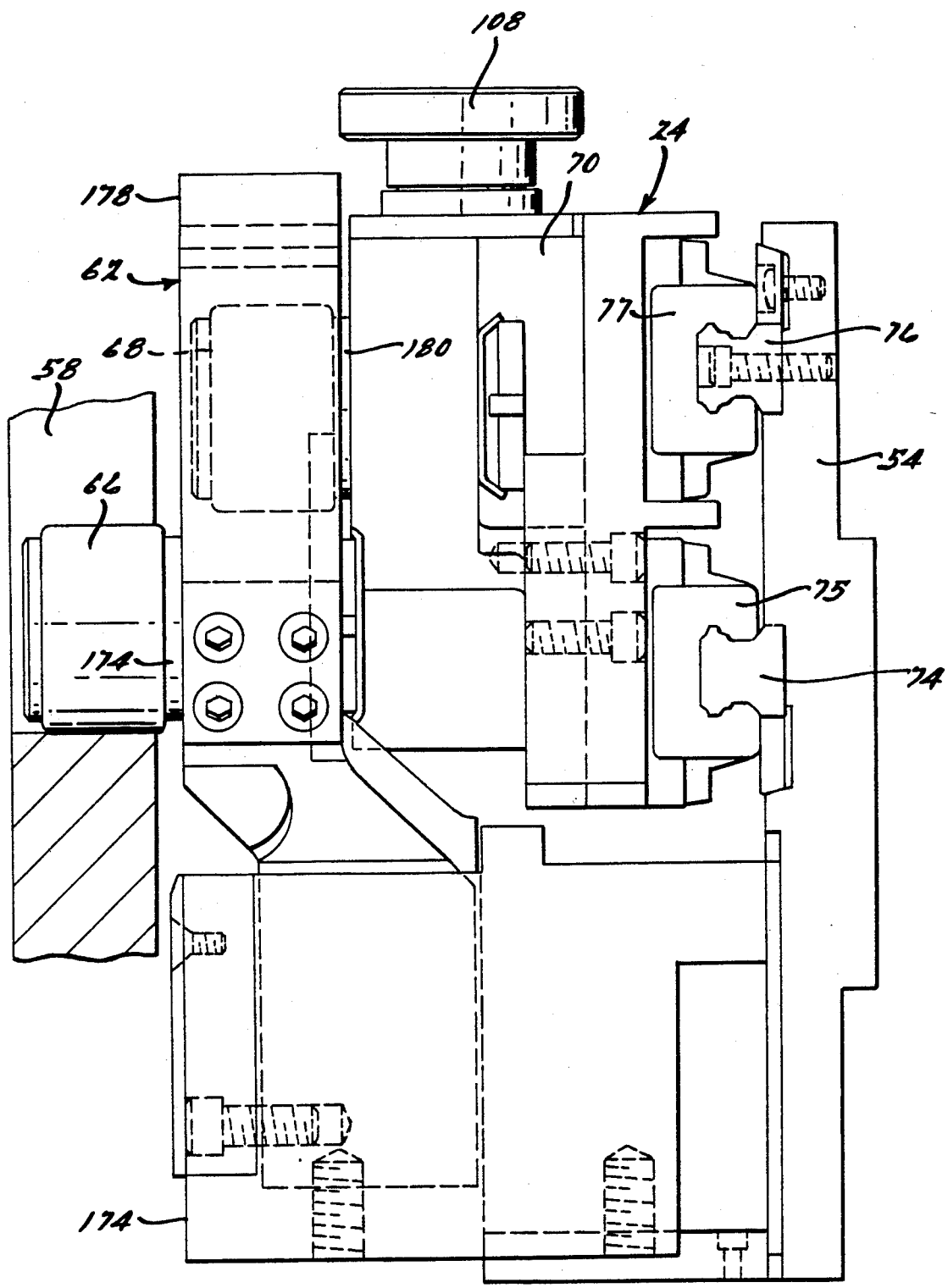

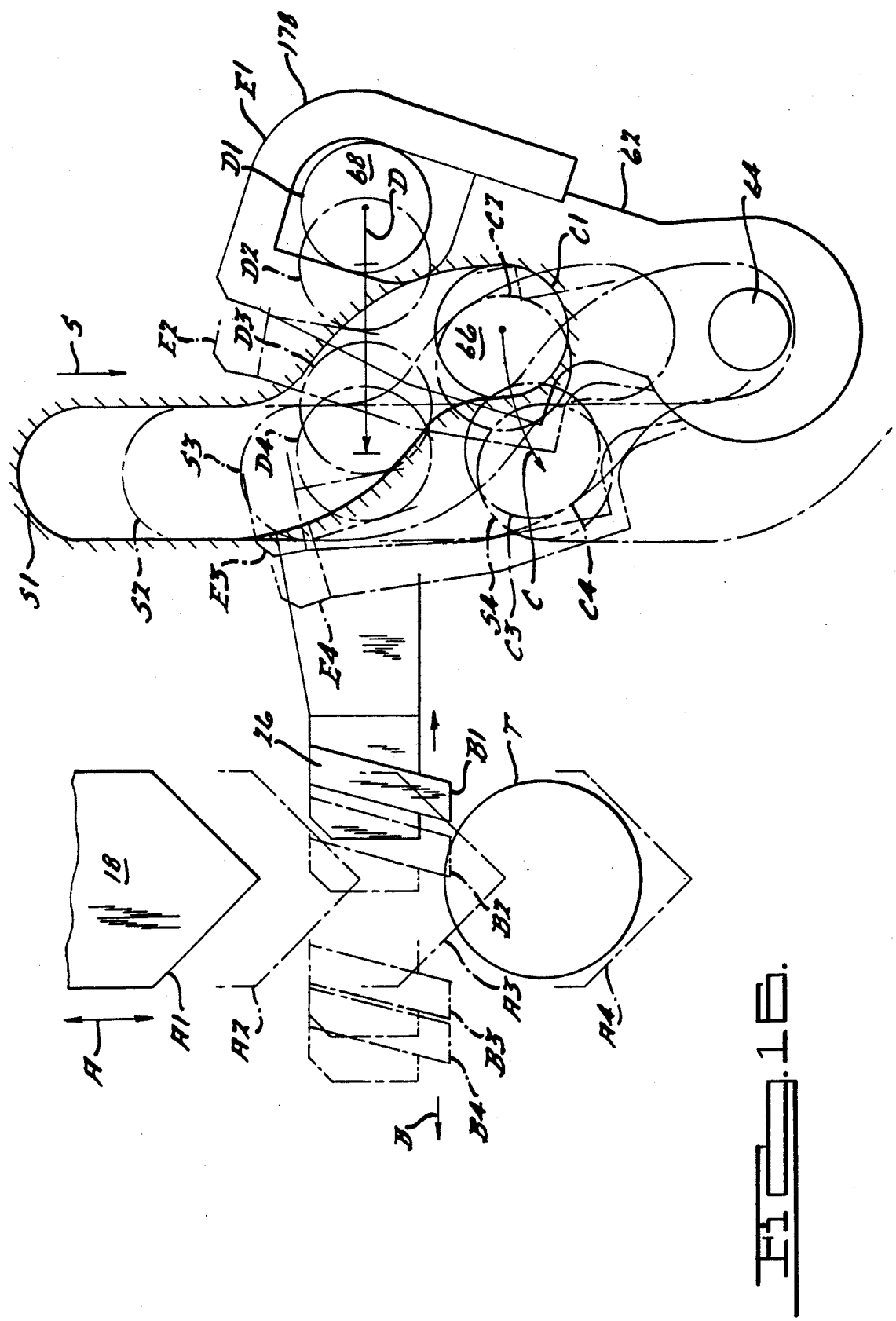

APPARATUS FOR SEVERING A TUBULAR WORKPIECE

BACKGROUND AND SUMMARY OF THE INVENTION

The present invention relates to apparatus, including a cartridge adapted to be removably mounted to the apparatus, for severing a tubular workpiece.

Tube cutting apparatus employed to sever sections of a continuous length of tubing or similar elongated stock fed from a source thereof such as a mill is known. Tube cutting apparatus in which a cut-off die set, driven by a ram assembly and clamped to the continuous length of tubing prior to and during the severing operation is exemplified by U.S. Pat. 4,653,368 issuing Mar. 31, 1987 to Riera et al., the disclosure of which being incorporated by reference herein. Riera discloses a tube cut-off die set including mechanism for providing a horizontal notching cut in a tubing wall followed by a vertical severing cut as the tube is fed through the set. The tub cut-off die set includes a movable upper shoe, a stationary lower shoe, guide posts and associated bearings affixed to the shoes and a ram providing the relative reciprocation between shoes. A tube holding arrangement therein comprises two axially spaced pairs of complementary die jaws being mounted on the lower die show for releasably clamping the tube. Downward reciprocation of a cam driver extending from the upper die shoe engages a pair of cam rollers associated with the lower die shoe to drive the die jaws about the tube and the blades between the jaw members.

The die set is used to cut sections of tubing as the tube is continuously manufactured. While suitable for its intended operation, the above-referenced die set does not allow for rapid adjustment of the die jaws so as to change their grip about the tube, and does not permit rapid replacement of the die jaws to accommodate different tube sizes and shapes. Since each tube diameter and cross section requires different jaw members it would be desirable to have jaw members that can be replaced and preset at a location spaced from the die set so that there would be no downtime of the tube-cutting apparatus. Further, a more compact jaw mounting arrangement would be desirable to reduce the overall size of the die set.

It is an object of this invention to provide a tube cut-off machine that maximizes the ease with which die jaws are replaced, to accommodate different tube diameters, without stopping the machine operation, and provide the user with an adjustment arrangement whereby the clamping force by the die jaws on the tube can be easily adjusted. Advantageously the use of a self-contained cartridge that includes the jaw members, cam followers and adjustment arrangement would allow the user to keep the machine cutting one particular diameter size while other cartridges are retrofitted with the appropriate jaw members, thereby reducing downtime of expensive machinery when it is time to change the jaws.

Part of the setup time of jaw members associated with the Riera machine was removing the cam driver prior to removal of jaw holders and then remounting the jaw holders and cam driver. This arrangement has an element of machine downtime. It would be desirable to provide rapid connecting and disconnecting arrangement for the cam driver. Desirably, such an arrangement would associate the desired jaw member spacing with the cam driver.

A further object of this invention is to provide a replaceable kit for use in a tube cutting machine which is simple, has jaw holders and jaw members preset, and is insertable as a unit. Advantageously, because the costs associated with the downtime of a machine is high and the costs of a cam driver relatively small, teardown and setup costs can be more than justified by such a kit. In this regard the kit advantageously permits only minimal downtime between removing cartridges and associated jaw holders when different tube diameters are to be cut.

One problem sometimes experienced in connection with tube severing machine is that the severed tube end portion is locally deformed and has what are termed "dimples." Tubes that are so formed are waste and thus costly. While the Riera construction including a horizontal notching blade cantilevered at the end of a cross slide in connection with the vertical severing blade has worked well in most situations, tube dimpling with some cross sections and tube thicknesses results. A tube severing arrangement which does not produce deformed cross sections would be desirable.

Another object of this invention is provision of a tube severing arrangement that permits severing of thicker and larger diametered tubes without breaking the blades or increasing the size of the machine into which they are mounted. Further, configuring the notching blade so as to have an offset portion surprisingly allows such tube cross sections to be cut.

The foregoing objects and advantages are accomplished by a tube cut-off machine for severing elongated material moving continuously longitudinally of its length, comprising relatively reciprocable upper and lower die shoes, one shoe mounting a tube cut-off blade and a cam driver, and tube clamping means for releasably clamping the tube during the severing operation. The tube clamping means includes two laterally spaced jaw holders each carrying a jaw member and positioning the tube clamping surfaces of the jaw members in confronting relation and a cam follower operably connected to one jaw holder.

In accordance with this invention, the tube clamping mans is characterized by a compact, self-contained, cartridge that is removably mounted to the die set as a single by replaceable unit. The cartridge comprises a carriage adapted to be mounted on the mounting surface of the lower die shoe so as to be stationary relative thereto, a pair of laterally spaced cam followers each being mounted on a cam holder one and the other follower being a roller and a replaceable wear pad, the two jaw holders and cam follower holders, respectively, being laterally spaced and slidably disposed on the carriage in confronting relation, bias means for laterally biasing the jaw holders apart, and adjustment means including a frame having an adjustment screw and operably associated with the carriage for adjusting the relative lateral separation between the jaw members, the frame maintaining the holders in side-by-side relation and the screw adjusting wear in the wear pad.

Advantageously the holders are separately manufactured and thus the assembly is less expensive because the need for a "beefed up" carriage construction is minimized. Separate parts weigh less, thus reducing forces needed during clamping/unclamping of the tube to overcome friction and inertia. Advantageously, the wear plate absorbs shock loads which might otherwise shear the pivot pin supporting a cam roller for rotation, resulting in costly repair and machine downtime.

A kit adapted to be mounted on the die set comprises the cam driver being operably disposed within the cartridge between the cam followers and their spacing preadjusted so that the jaw members are at their desired separation for clamping about the tube. The kit is mounted separately to the machine and requires minimal assembly time.

In accordance with one mounting arrangement, the cartridge is slid beneath a pair of gibs to secure the cartridge to the lower shoe, a dowel pin in a driver holder is connected to the upper shoe, and a pair of driver clamping plates on the driver holder are tightened behind the cam driver.

The cam driver has compliant load bars adapted to engage both cam followers to reduce uneven loads placed on the cam followers.

Further in accordance with this invention, the die set includes four bushings with their vertical axes disposed in a rectangular array with first, second and third adjacent pairs being secured together, respectively, by a first tie bar, a second tie bar and rail mounting plate, and the horizontal notching blade is vertically adjustable relative to a holding bar adapted to move between vertical planes including the first and third pair of bushings. Advantageously, a stiffening arrangement including three guide bushings including the second tie bar and rail mounting plate, the bashing axes forming a right triangular array, can stiffen the die set to obviate wobble of the notching blade.

BRIEF DESCRIPTION OF THE DRAWINGS

The preferred embodiments of the invention are illustrated in the following drawings in which:

FIG. 8 is a perspective view of the vertical notching blade and a backing plate.

FIG. 9 is a front elevation view of the notching blade and a laterally offset portion thereof.

FIG. 10 is a side view, partially in section, showing the cam driver and compliant surfaces thereof for engaging a pair of cam followers in the cartridge.

FIG. 11 is a plan view, in section, taken along line 11—11 of FIG. 10.

FIG. 12 is a plan view, like FIG. 11, showing the compliant surfaces engaging the cam followers.

FIG. 13 is a side elevation view of the rail mounting plate and the horizontal blade holder assembly.

FIG. 14 is an elevation view in section of the pivoted end portion of a driver link taken along line 14—14 of FIG. 1.

FIG. 15 is an end elevation view showing the horizontal blade holder assembly, the rail mounting plate and a cam follower adjacent a cam driver plate of the apparatus.

FIG. 16 is an operational view showing the paths of two cam follower rollers connected to the driver link one positioned within a slot of a cam driver plate and the other connected to the horizontal blade holder assembly to drive the notching blade horizontally as the driver plate is driven vertically.

DETAILED DESCRIPTION OF THE PREFERRED EMBODIMENT

Figure 1:
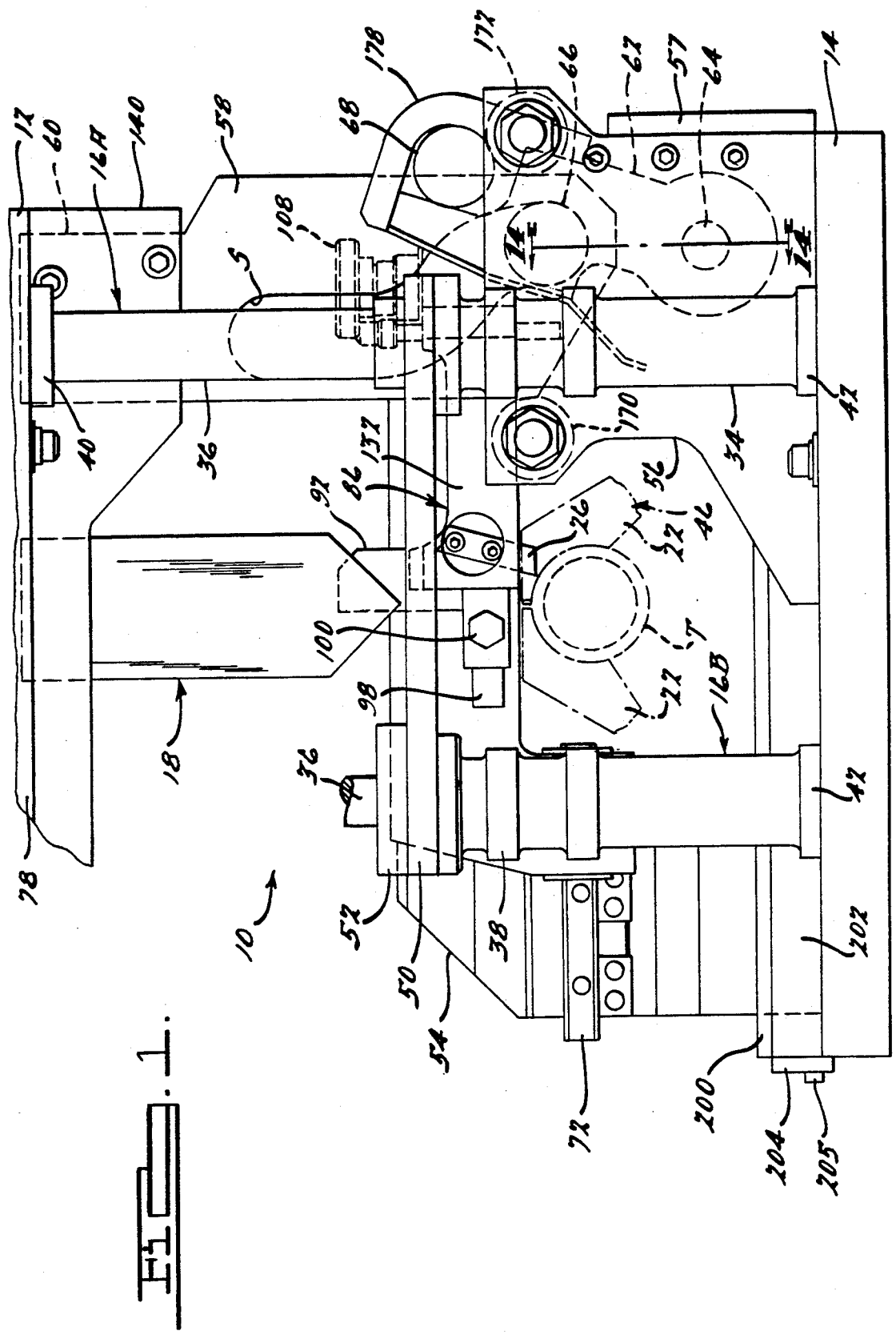
FIG. 1 is a fragmentary front elevational view of a tube cutting apparatus having a tube clamping mechanism in the form of a single removable cartridge driven by a compliant cam driver that is mounted to a lower die shoe, the cartridge being positioned relative to vertical and horizontal tube severing and notching blades shown in their upwardmost position and the notching blade being mounted to a horizontal blade holder.

Referring to the drawings, tube cut-off die set 10 for use in a vertically reciprocating press comprises a movable upper die shoe 12, a stationary lower die shoe 14, guide post means 16 fixed to the shoes and interconnecting the shoes for vertically guided reciprocation to effect the work, a cut-off blade mounted 18 on the upper shoe for movement in a vertical tube severing plane, tube holding means 20 including jaws 22 slidably mounted on the lower die shoe for releasably clamping a tube T on both sides of the severing plane, slide means 24 mounted on the lower shoe for moving a slotting blade 26 horizontally in the severing plane for notching the upper wall of the tube, and drive means 28 including a cam driver 30 extending vertically downward from the upper die shoe for driving the jaws into clamping engagement with the tube.

The guide post means 16 includes four guide posts 16A, 16B, 16C and 16D each comprising a bushing 34 and bearing rod 36 slidable in the forward end portion 38 of its respective bushing. Respective like ends 40 and 42 of the guide posts are affixed by bolts to the upper and lower shoes for guiding relative vertical reciprocation. The guide posts have parallel axes with the axes of guide posts 16A, 16B and 16C, 16D lying spaced apart in vertical planes parallel to the severing plane and the axes of guide posts 16B, 16C and 16A, 16D lying spaced apart in vertical planes transverse to the severing plane.

While lower die shoe 12 is referred to as a stationary shoe this only denotes that it is stationary vertically but the entire die set can be mounted for horizontal movement as where it is associated with a tube mill continuously producing tubing so that the dies move with the tubing during the cut-off operation. Thus, as described in Riera, upper die shoe 14 can have ways which permit movement along flanges of a ram assembly adjacent the upper die shoe and lower die shoe can have bearing plates which ride in ways and guides.

Figure 2:
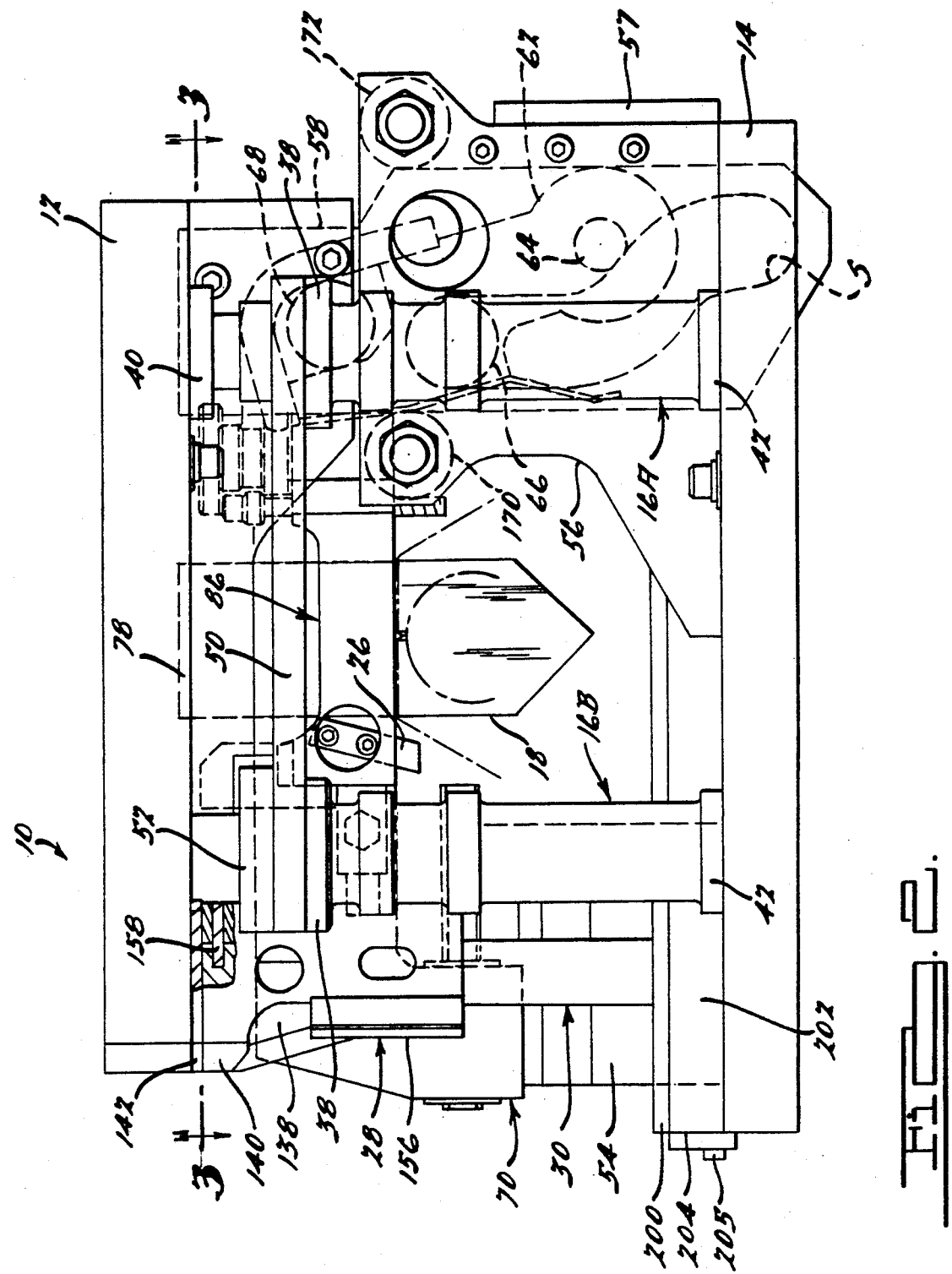
FIG. 2 is the front elevational view of the apparatus shown in FIG. 1 with the upper die shoe and the notching and cut-off blades in their downwardmost position.
Figure 20:
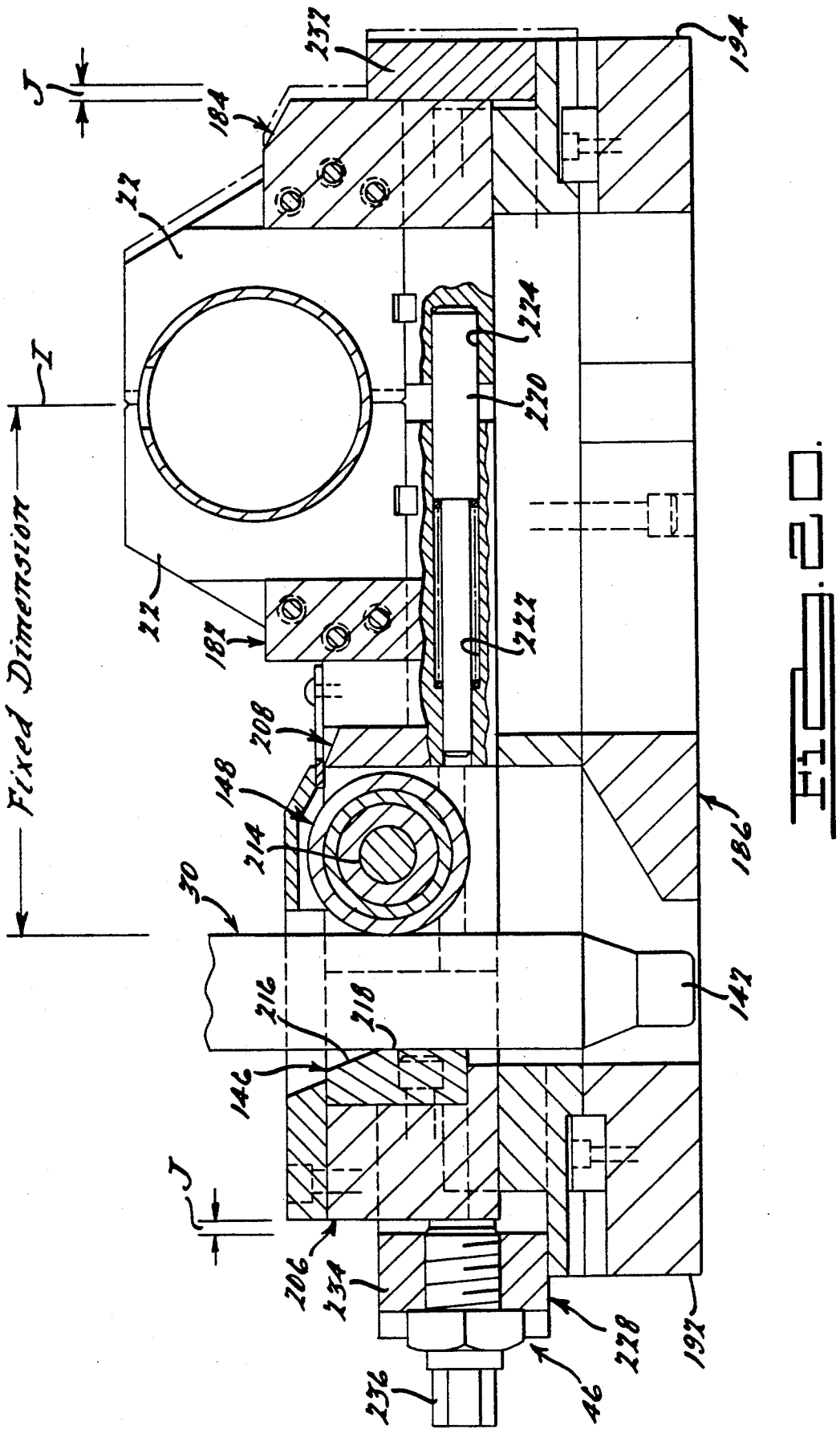
FIG. 20 is a section view taken through the longitudinal mid-axis of the cartridge along line 20—20 of FIG. 18.
Figure 21:
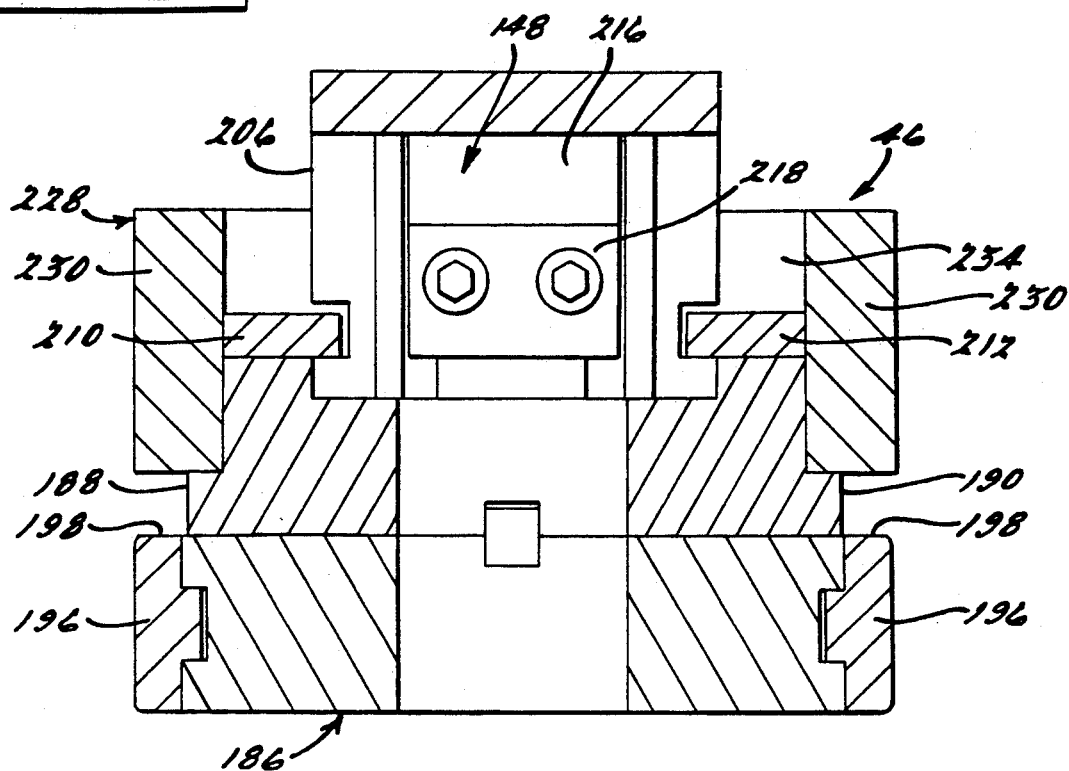
FIG. 21 is an elevation view in section taken along line 21—21 of FIG. 18.
Figure 22:
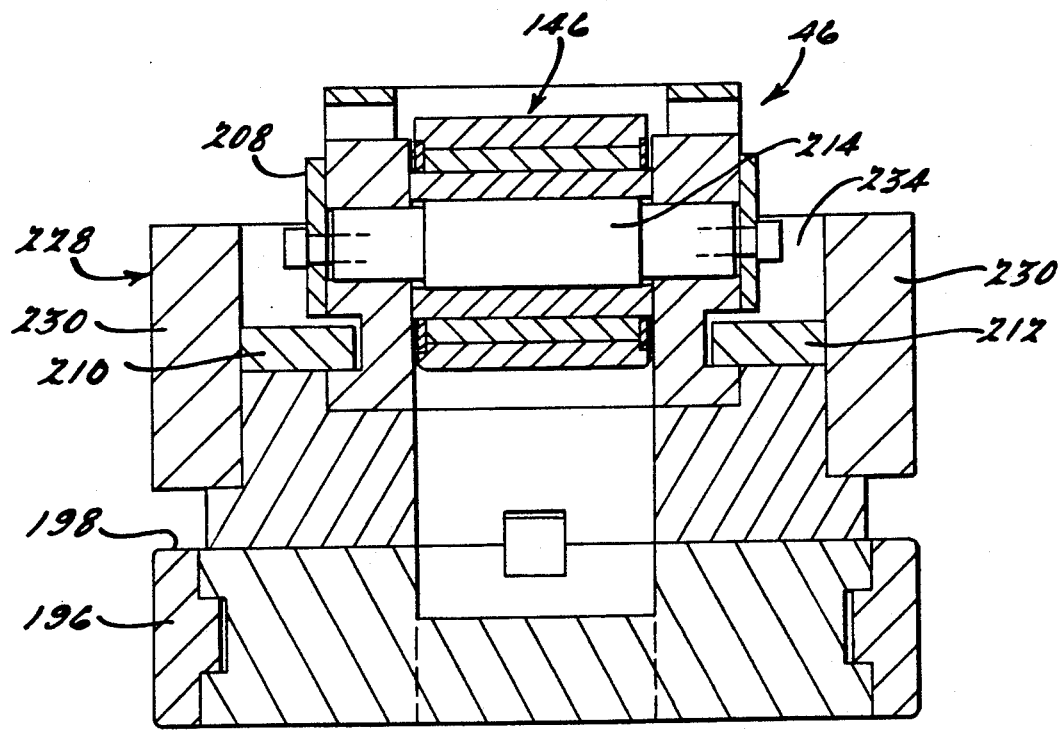
FIG. 22 is an elevation view in section taken along line 22—22 of FIG. 18.
Figure 23:
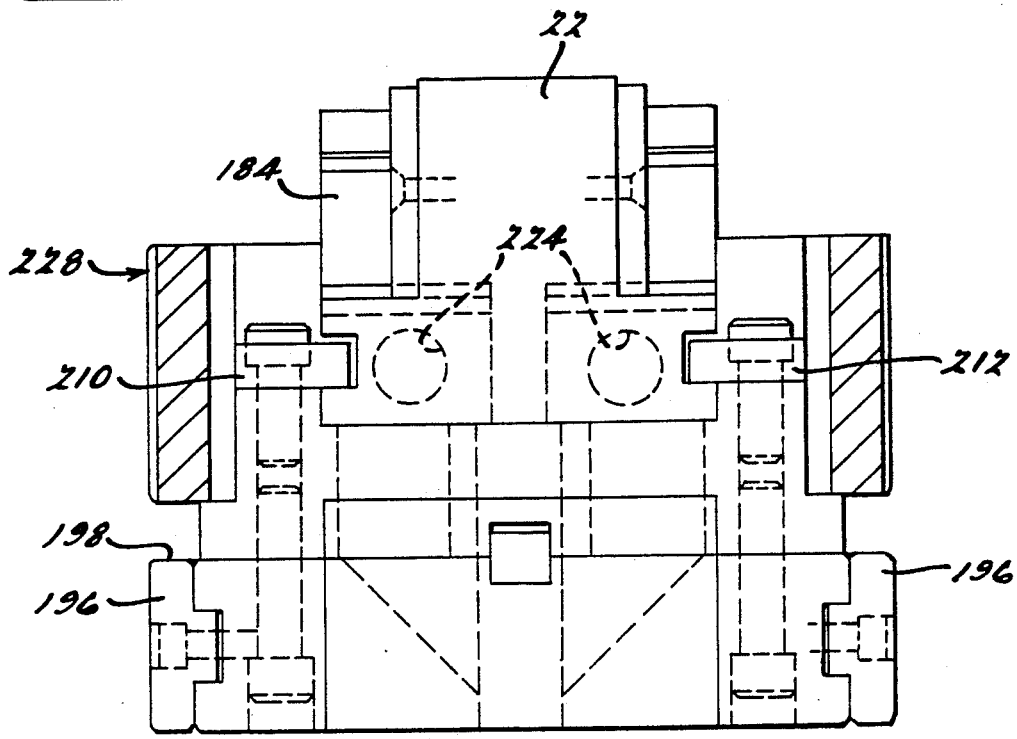
FIG. 23 is an elevation view in section taken along line 23—23 of FIG. 18.
Figure 24:
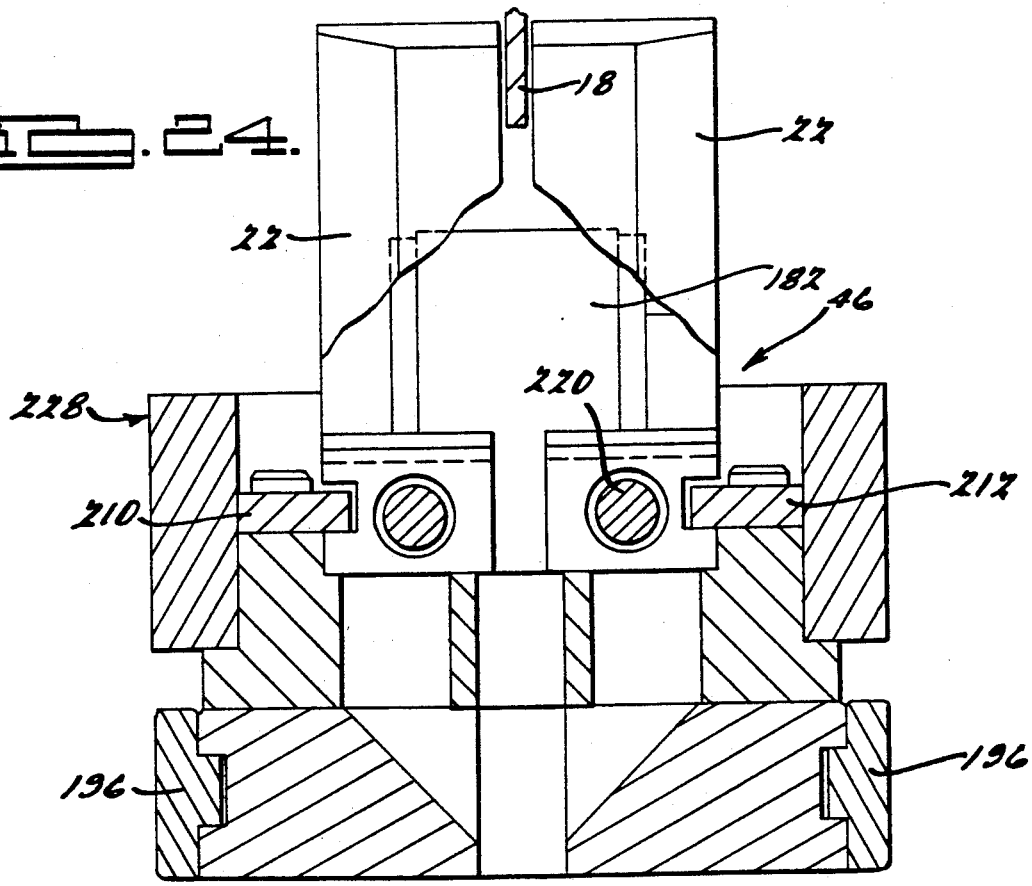
FIG. 24 is an elevation view in section taken along line 24—24 of FIG. 17.
Figure 25:
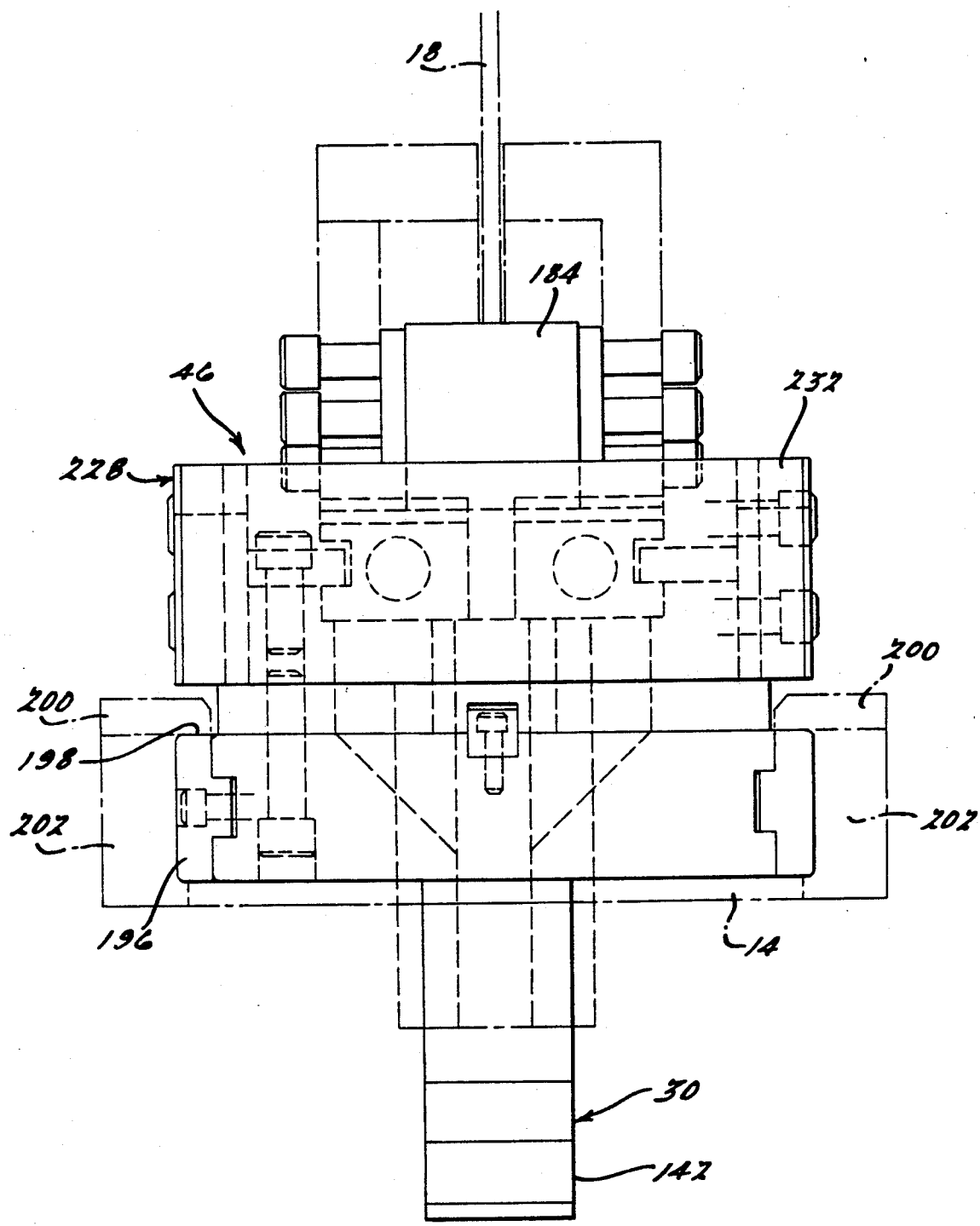
FIG. 25 is an end view of the cartridge.

As shown in phantom in FIGS. 1 and 2 a cartridge 46 receives tubing T to be cut into predetermined lengths, the tubing being passing through the die set in a direction perpendicular to the paper. The tube is clamped at the beginning of the cut-off cycle between complementary conforming jaws 22 shown in their open position in FIG. 17 and in their closed or clamped position engaging T in FIGS. 1, 2 and 20.

In accordance with this invention, to enhance resistance to side thrusts that could be supplied by the ram operating the die set, the die set is appropriately rigidified and stiffened without sacrificing compactness of design. In this regard, the four guide posts 16A, 16B, 16C and 16D each include first and second ends 40 and 42 that are affixed to one and the other die shoe and cooperate to guide vertical reciprocation of the shoes, each guide post extending axially and the axes of the posts defining a rectangular array. Each guide post comprises a guide being rod 36 mounted for reciprocation within a guide bushing 34, the bearing rod including a first end 40 and the guide bushing including a second end 42 and a forward end portion 48 for receiving the reciprocating bearing rod. The forward end portions 38 are spaced vertically from the lower die shoe in substantially the same horizontally plane and are approached by the upper die shoe 12 reciprocating vertically thereto.

Forward end portions 38 of the guide posts 16 are stiffened to form a box-like structure, the stiffening arrangement including a first tie bar 50 that connects adjacent first guide posts 16A and 16B, a second tie bar 52 that connects adjacent second guide posts 16B and 16C and a rail mounting plate 54 that connects adjacent third guide posts 16C and 16D. The adjacent fourth guide posts 16D and 16A are rigidified by the cooperative relation between a driver link guide bracket 56 and guide bracket strap 57, adjacent the bushing 16A, each being connected along its lower edge to the lower shoe and to one another along like adjacent vertical edges, a cam driver plate 58 rigidly connected at one end 60 to the upper shoe for vertical reciprocation therewith, a driver link 62 rotatably secured by a pin 64 to the lower shoe via its connection to bearing 65, a first cam roller 66 connected to driver link 62 and associated with cam driver plate 58 and a second cam roller 68 associated with a blade holder bearing member 70 connected to the rail mounting plate 54 and the driver link 62. Rail mounting plate is rigidly secured along a lower edge thereof by bolts to lower die shoe and includes longitudinally extending guide rails 72, 74 and 76 each receiving a respective bearing 73, 75 and 77 connected to the horizontal blade holder bearing member 70 for horizontally moving the notching blade across the tube.

Figure 3:
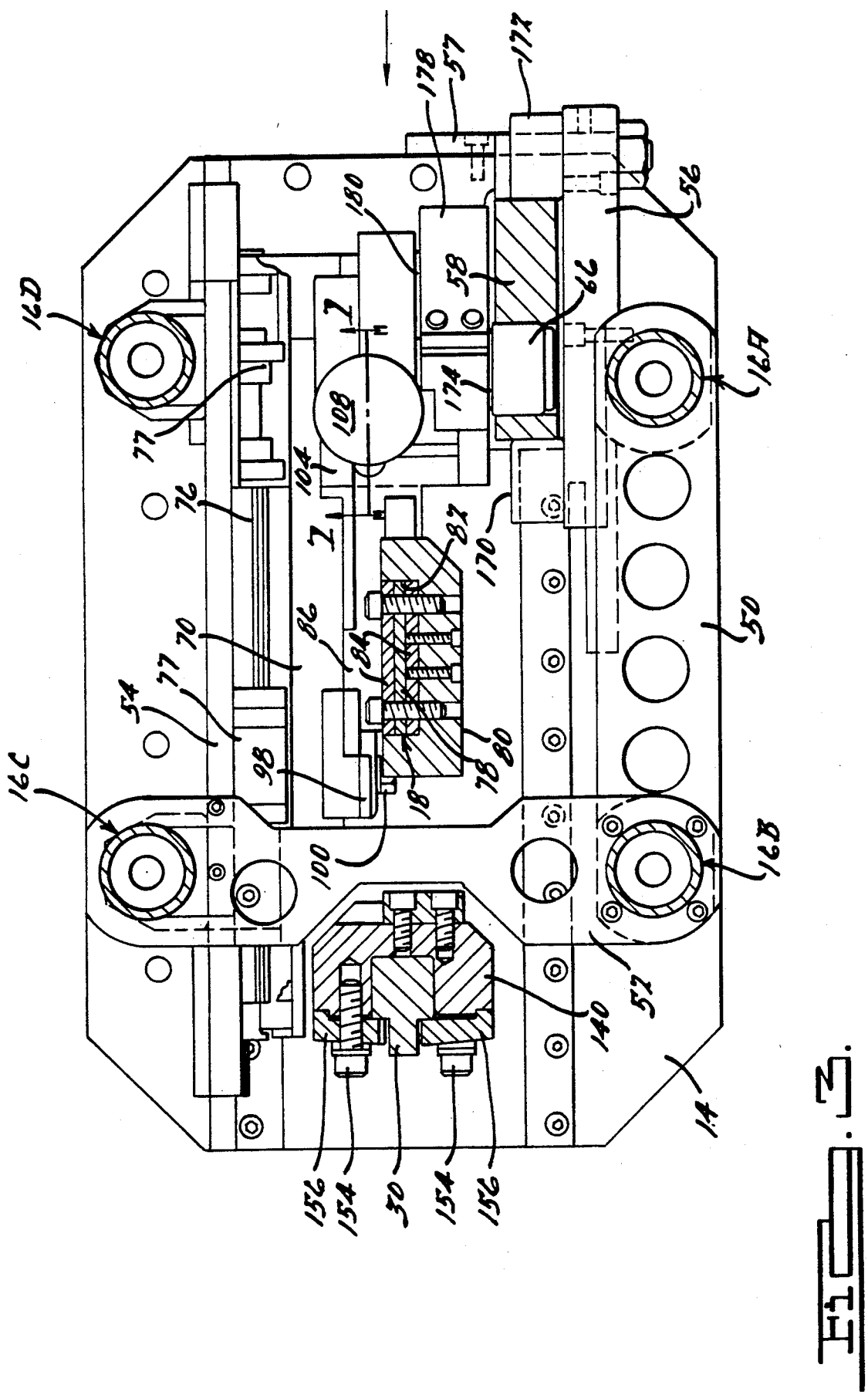
FIG. 3 is a plan view taken along line 3—3 of FIG. 1 showing a pair of tie bars and a mounting plate holding guide posts together and apparatus for driving the notching blade to the left.

Shown best in connection with FIGS. 1-3, vertical severing blade 18 is generally planar and includes a rearward end portion 78 connected to a vertical blade holder 80 and a forward end portion having a V-shape for severing the tube. Vertical blade holder, connected to upper die shoe, includes a cavity 82 sized to receive the blade sandwiched between a pair of shim plates 84, the shim plates being secured to the block by bolts. The shim plates allow the blade to be changed if a thicker plate is needed.

Horizontal slotting blade 26 is held in a horizontal slotting blade holder 86 connected at one end by a drive block 88 to the horizontal blade holder bearing member 70, the blade holder bearing member having guide bearings 73, 75 and 77 connected to guide rails 72, 74 and 76 on the rail mounting plate 54. The rails and guide bearings are best shown in end view FIGS. 13 and 15. The horizontal slotting blade holder is adjustably affixed to the blade holder bearing member for vertical movement towards the jaws 22 to notch tubing of smaller diameter. Slotting blade holder 86 has its opposite end portions rigidly secured to the holder bearing member with one end having a T-shaped cross section 90 and the other end having a vertically rising leg 92. The T-shaped end 90 is adapted to be fitted to a cavity formed on the driver block by a pair of holder gibs 94 secured by bolts 96 to drive block 88 whereby to form a T-shaped way. A horizontal blade clamp 98 is secured to the bearing mounting plate by a bolt 100. Tightening or loosening of the bolt causes the leg 92 to be tightly gripped or released for movement.

Vertical adjustment of horizontal slotting blade holder 86 is accomplished by operation of the bolt 100 and a lead screw 102 at the T-shaped end of the holder. A lead screw bearing housing 104 is mounted on horizontal blade holder bearing member 70 with the lead screw being rotatably journalled to the bearing housing 104 and a pressure screw 106 threadably advanced therethrough. One end of lead screw includes an adjusting knob 108 and the other end portion 110 is threaded and threadably engaged with the slotting blade holder 86 with threadable advance of the threaded end portion threadably advancing the blade holder relative to blade holder bearing member 70. Use of Acme thread for end portion 110 assures that when the knob is rotated there is no slop or lost motion in advancing blade holder 86 upwardly or downwardly. Any rotation of portion 110 is accurately reflected in blade holder movement. To lock the slotting blade holder relative to the T-shaped way, the bottom surface of the knob has detents 112 sized to receive a conical-shaped portion 114 provided at one end of pressure screw, the other end 116 of pressure screw threadably engaged with the blade holder.

Movement of the blade 26 is permitted first by threadably advancing the pressure screw 106 towards the blade holder 86 thereby moving the conical tip 114 downwardly from seated engagement within a detent 112 whereby knob 108 can be rotated and slotting blade holder 86 moved vertically relative to the blade holder bearing member 70. To secure blade holder 86 at a desired spacing from jaws 22, the pressure screw is rotated in the opposite direction, driving the pressure screw and its conical end vertically upward and into seated engagement with a detent to prevent rotation of the knob. The knob is secured to lead screw by a self-locking bearing nut 118. The vertical leg 92 at the other end of slotting blade holder 86 is then clamped by horizontal blade clamp 98 to the blade holder bearing member 70 by tightening of bolt 100, thereby to secure the blade clamp against the blade holder. The length of leg 92 determined how much vertical travel the blade holder may undergo to advance towards the jaw members and still be rigidly secured. Advantageously, such mounting of the notching blade holder 86 assures that horizontal movement of notching blade 26 and blade holder 86 will not be accompanied by lateral wobble outside of the vertical severing plane, such as represented by G in FIG. 13. Such wobble will reduce the amount of notching force delivered to the tube and leads to blade breakage.

Figure 4:
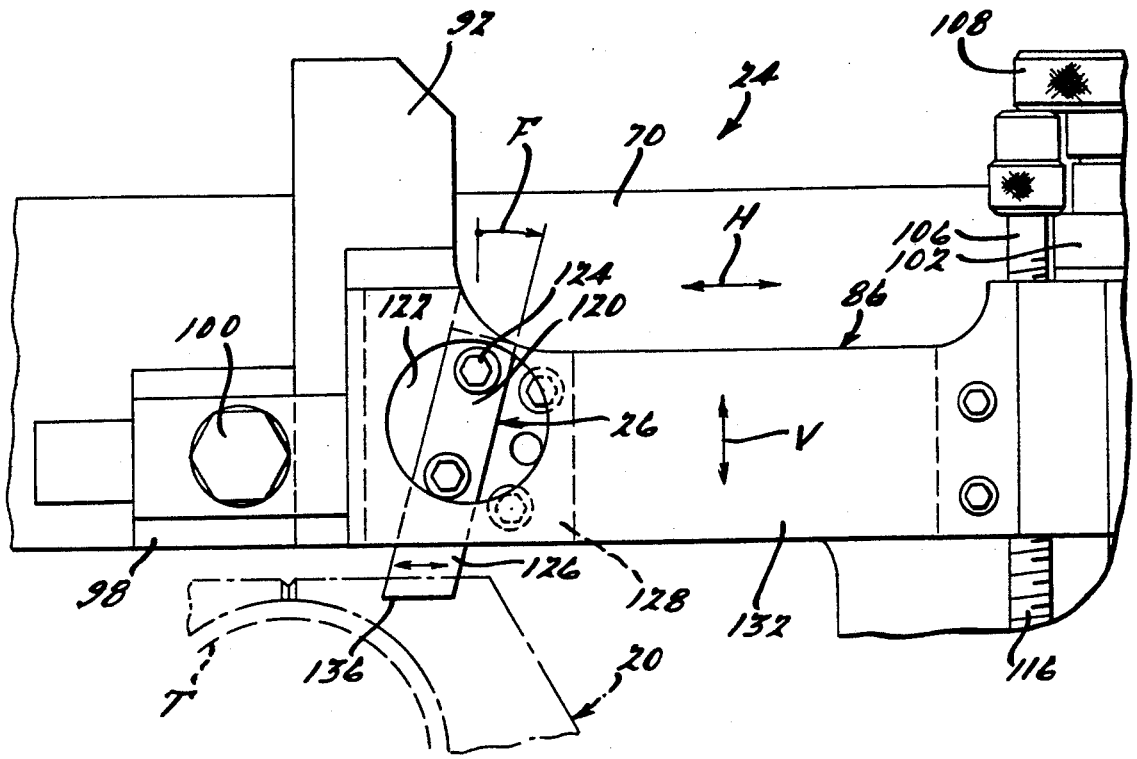
FIG. 4 is an enlarged elevation view of the horizontal blade holder and the horizontal notching blade shown in the apparatus of FIGS. 1 and 2.
Figure 5:
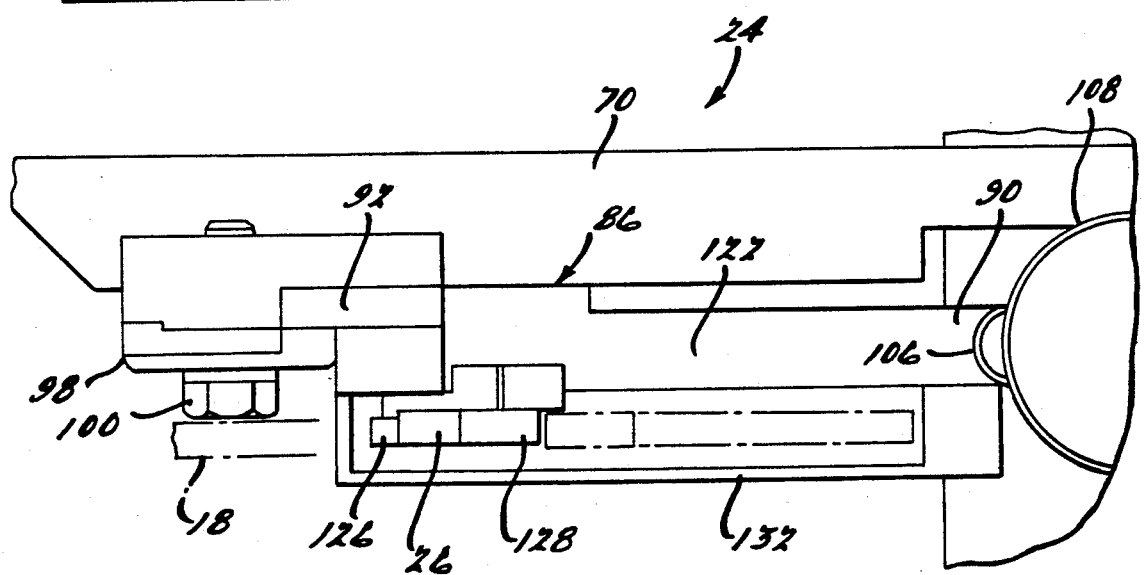
FIG. 5 is a plan view of the horizontal blade holder and notching blade shown in FIG. 4.
Figure 6:
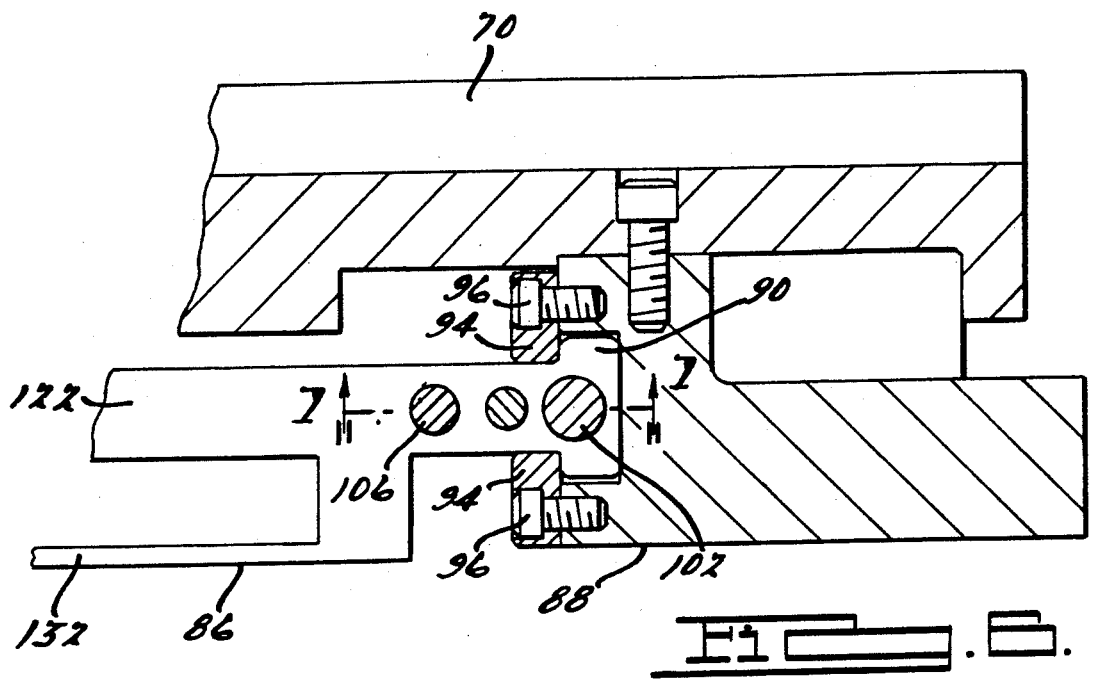
FIG. 6 is a plan view, partially in section, showing detail of the horizontal blade holder and a drive block.
Figure 7:
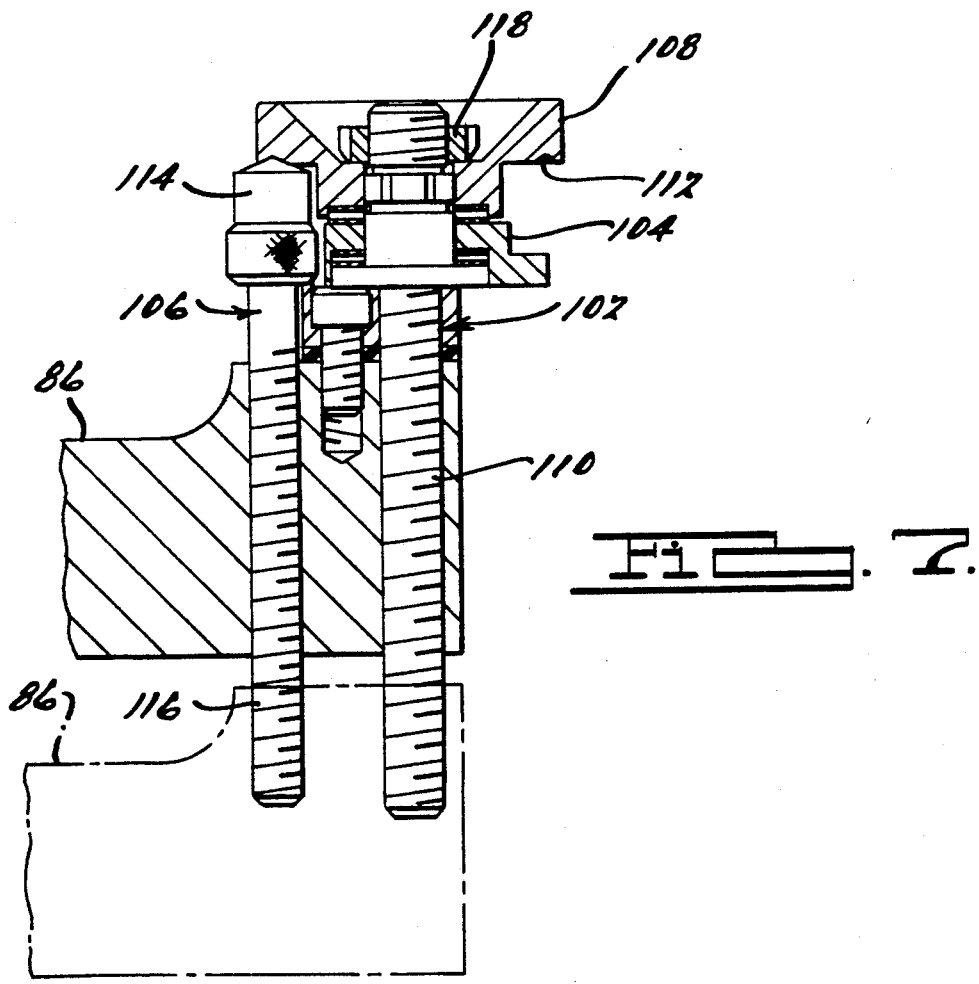
FIG. 7 is a partial section view taken along line 7—7 of FIG. 3 showing an adjustment arrangement whereby the horizontal blade holder and notching blade may be moved vertically relative to jaw members carried by the cartridge.

Shown best in FIG. 4, notching blade 26 is coplanar with blade holder 86 and disposed at an acute angle to the axis of reciprocation, designated by the angle F, and has a rearward end portion 120 secured to an inward plate 122 of the holder by bolts 124 and a forward end portion 126 extending downwardly from blade holder. To provide support for notching blade 26 and permitting different blades to be used, inward plate has an acutely angled detent space which is wider than that of the smallest blade desired. When a smaller notching blade is used, a backing plate 128 supportingly abuts a trailing edge 130 of the blade. An outward plate 132 of the blade holder has a circular opening 134 for mounting and/or replacing a new notching blade from blade holder 86, the outward plate of the holder inhibiting metal chips from flying from the blade holder.

Advantageously, the forward and rearward end portions 120 and 126 of notching blade 26 are disposed in laterally offset vertical planes. The blade is disposed at an angle of about 10°-20° relative to the vertical axis with 15° being found preferable in one application. The forward end surface 136 of notching blade, when mounted, is preferably in a horizontal plane that is parallel to the direction of movement of the blade holder. Blade clamp 98 preferably is proximate the notching forward end portion 126 of notching blade 26.

Cam driver 30 is elongated and generally of rectangular cross section. The top portion 138 is adapted to be mounted to a driver holder 140 connected to a driver holder back plate 142 secured by appropriate bolts to upper die shoe 12. The bottom driving end portion 144 of the am driver has a reduced width and is adapted to be driven between a pair of cam followers 146 and 148 to drive a pair of jaw holders 150 and 152. Securement of cam driver 30 is accomplished by loosening bolts 154 that attach driver clamping plates 156 to driver holder 140 and sliding them laterally, the clamping plates being disposed at the throat of a rectangular cavity for seating the cam driver. The top portion 138 of cam driver 30 is inserted into the cavity and retained to the driver holder by a dowel pin 158, whereupon the clamping plates 156 are slid back to captivate the cam driver in the cavity and the bolts tightened.

Cam driver 30 advantageously would be compliant along its cam follower engaging surfaces to obviate wear, compensate for unsymmetrical forces from the ram, reduce possible overload conditions on the roller, and provide shock absorbance. Shown in FIGS. 10 and 11, cam driver 30 has a central portion 160 generally rectangular in section with opposite sides having ways 162 within which are mounted load plates 164 that are biased outwardly by heavy-duty springs. As shown in FIG. 10, a longitudinally elongated, undulating, the leaf springs 166 force load plates 164 outwardly of their respective way 162. FIG. 11 shows, for the purposes of illustration, that a coil spring 168 could be used. In particular, a plurality of coil springs would be mounted in side-by-side relation to support the length of its load bar. Of course, such approach would permit the compliance of the bar to be changed, depending on the stiffness of the coil springs selected and where positioned. Although not shown a pad of elastomer (e.g. Neoprene or a suitable rubber) could be disposed in the way behind the load bar. Vertical reciprocation of the cam driver will slightly compress the springs and depress the load plates 164 with unsymmetrical loads being cushioned the load plates. Desirably, the spring will uniformly cushion the load bar such that when engaged by the cam driver the load bar surface is in a vertical plane.

FIG. 12 shows the cam followers 146 and 148 in cartridge 46 engaging the load plates. The load plates will deflect into their way in such manner that the cam followers will engage the load plate but not the cam driver. Advantageously, the load plates could be made of a wear resistant material and the body of the cam driver of a less expensive material.

Cam driver plate 58 is rigidly connected by driver holder 140 to upper die shoe with reciprocation of the upper die shoe causing the cam driver plate to be driven vertically downward towards lower die shoe. The cam driver plate includes a generally vertically extending S-shaped cam slot sized to receive roller cam follower 66 extending from driver link 62, vertical reciprocation of upper die shoe causing lower roller cam follower 66 to move from a position where it is at the bottom of the slot S and to a position where it is at the top of the slot. Driver link guide bracket 56, secured along its lower edge to lower die shoe 14, has a pair of roller cam followers 170 and 172, each cam follower being a roller rotatably pinned to the guide bracket and adapted to engage one respective lateral edge of cam driver plate 58 to constrain its vertical movement. The axes of rotation of cam followers 170 and 172, the direction of horizontal movement of the horizontal blade holder 86, and the path defined by cam follower 68 are generally disposed in a common horizontal plan. To obviate undesired wobble of the cam driver plate 58, one or both of the cam followers 170 and 172 may be eccentrically mounted such that if they are rotated about their mounting pin, they will orbit towards the plate whereby to snug the engaging fitment against the driver.

A link housing 174, connected to lower die shoe 14, has driver link 62 rotatably connected thereto by link pivot shaft 64. Driver link includes cam follower 66 pinned thereto by shaft 176 and a driver link cap 178 which drives cam roller 68. The lower cam roller 66 is received in slot S of vertically reciprocating cam driver plate 58 and cam roller 68 is rotatably connected by a support shaft 180 to horizontal blade holder bearing member 70, rotation of the driver link 62 driving the blade holder bearing member horizontally.

FIG. 16 shows general operation of the die set with four positions being shown relative to the tube T with vertical severing blade 26 designated as A, horizontal notching blade 18 designated as B, link cap 178 on drive link 62 designated as E, cam roller 68 within the link cap designated as D, the slot in cam driver plate 68 designated as S, and cam roller 66 within the slot designated as C. The successive positions are, respectively, A1-A4, B1-B4, C1-C4, D1-D4, E1-E4 and S1-S4. At the first position, vertical severing blade A and slot S are at their uppermost positions, designated A1 and S1. Notching blade B and cam roller D are at the furthest right positions, designated B1 and D1. As cam driver plate is driven vertically downward by the operation of ram press, the slot S and severing blade A move vertically downward to S2 and A2, causing the cam rollers to move to positions C2 and D2 and the notching blade to B2 to nick the top of tube T. Further downward movement of cam driver plate moves slot S to position S3, the horizontal notching blade B moves past the tube to position B3 and the vertical severing blade partially cuts through the tube. Complete downward movement of cam driver plate moves slot S to S4 which is the final position of cam rollers C and D, designated as C4 and D4, and of the vertical and horizontal cutting blades with notching blade B being at B4 and vertical severing blade being at A4 and completely cut through tube. Generally points D1-D4 define a horizontal plane when the ram draws cam driver upwardly, the positions are retraced.

Cartridge 46 is removably mounted to lower die shoe 14 and is self-contained so as to allow adjustment of jaw holders 182 and 184 and replacement of the jaw members 22 to cut tubing of different diameters. The cartridge includes a generally oblong saddle or carriage 186 adapted to be removably mounted to and stationary relative to lower die shoe, the saddle defined by a pair of longitudinal sidewalls 188 and 190 and a pair of lateral end walls 192 and 194 with each sidewall including a holding pad 196 secured therealong to protect the saddle and form a shoulder 198 which is adapted to be abutted by a respective carriage gib 200 extending from a respective carriage retainer 202 secured to the lower die shoe, the gibs and retains forming a rectangular way to guidingly receive the cartridge. To secure the cartridge to die shoe 14, a strap 204 may be used to prevent egress from the way defined on the shoe by the gibs and retainers. It will be understood that cam driver 30 may be sufficient to retain cartridge 46 to the shoe in that when mounted to the die set the opposite ends 183 and 144 of the cam driver are disposed in each respective shoe, preventing lateral withdrawal from the shoe.

The cartridge mounts in side-by side fashion on an upper portion of the saddle a pair of cam follower holders 206 and 208 and the pair of jaw holders 182 and 184, each holder being a separate part, the respective pairs laterally confronting and slidably mounted. The jaw holders and cam holders include ways along their sides and are slidingly retained to the saddle by left and right gip 210 and 212 being seated in a respective way, the gibs 210, 212 being suitably bolted to base 186.

The cam follower holders 206 and 208 each include a cam follower, holder 206 carrying cam follower 146 which is a removably mounted wear plate and the holder 208 carrying cam follower 148 which is a roller. A vertical passage sized to pass cam driver 30 is defined between the wear plate 146 and the roller 148, the forward end portion of the cam driver being adapted to reciprocate vertically in the passage. The cam roller 148 is rotatably mounted to its holder by a roller stud 214. The wear plate 146 is removably bolted to holder 206 and includes a first flat face 216 at an acute angle to a vertical to guide the narrowed forward end portion of the cam driver into the passage and a second flat face 218 in a vertical plane to engage the cam driver, such as defined by the load plate.

Figure 17:
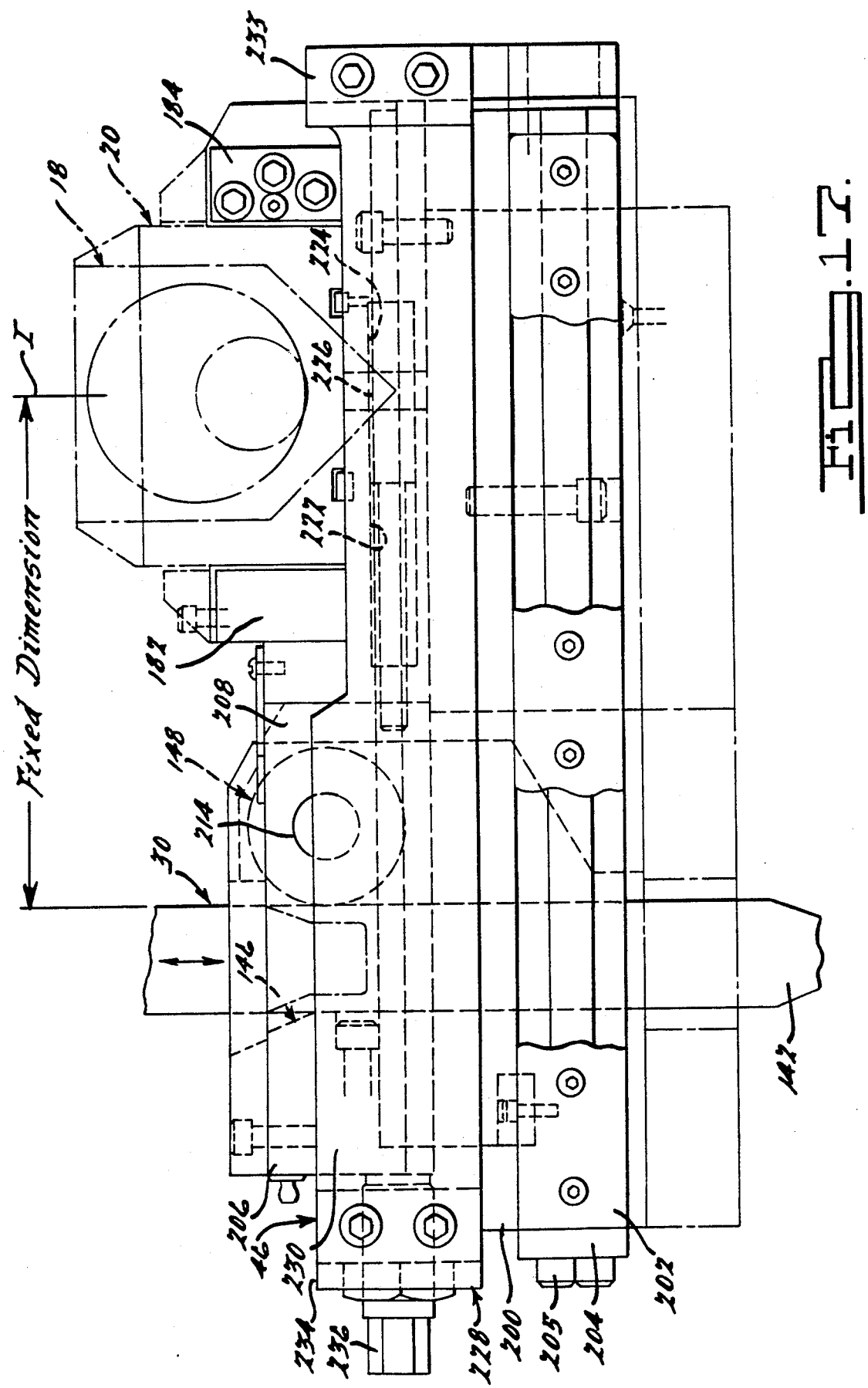
FIG. 17 is a side elevation view of the removable cartridge, shown in phantom in FIGS. 1 and 2, including the cam driver, to define a removable kit.
Figure 18:
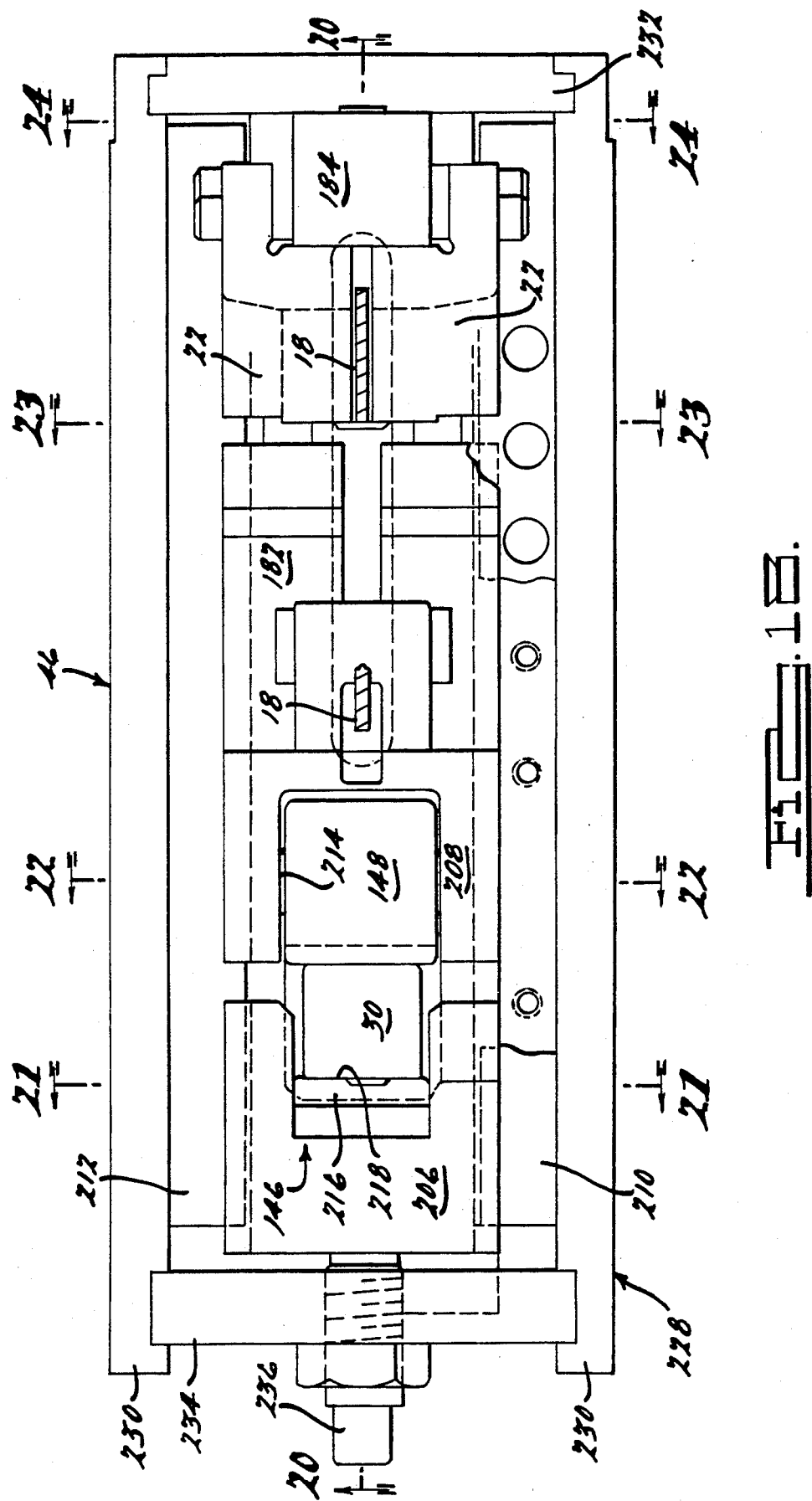
FIG. 18 is a top plan view of the cartridge shown in FIG. 17.
Figure 19:
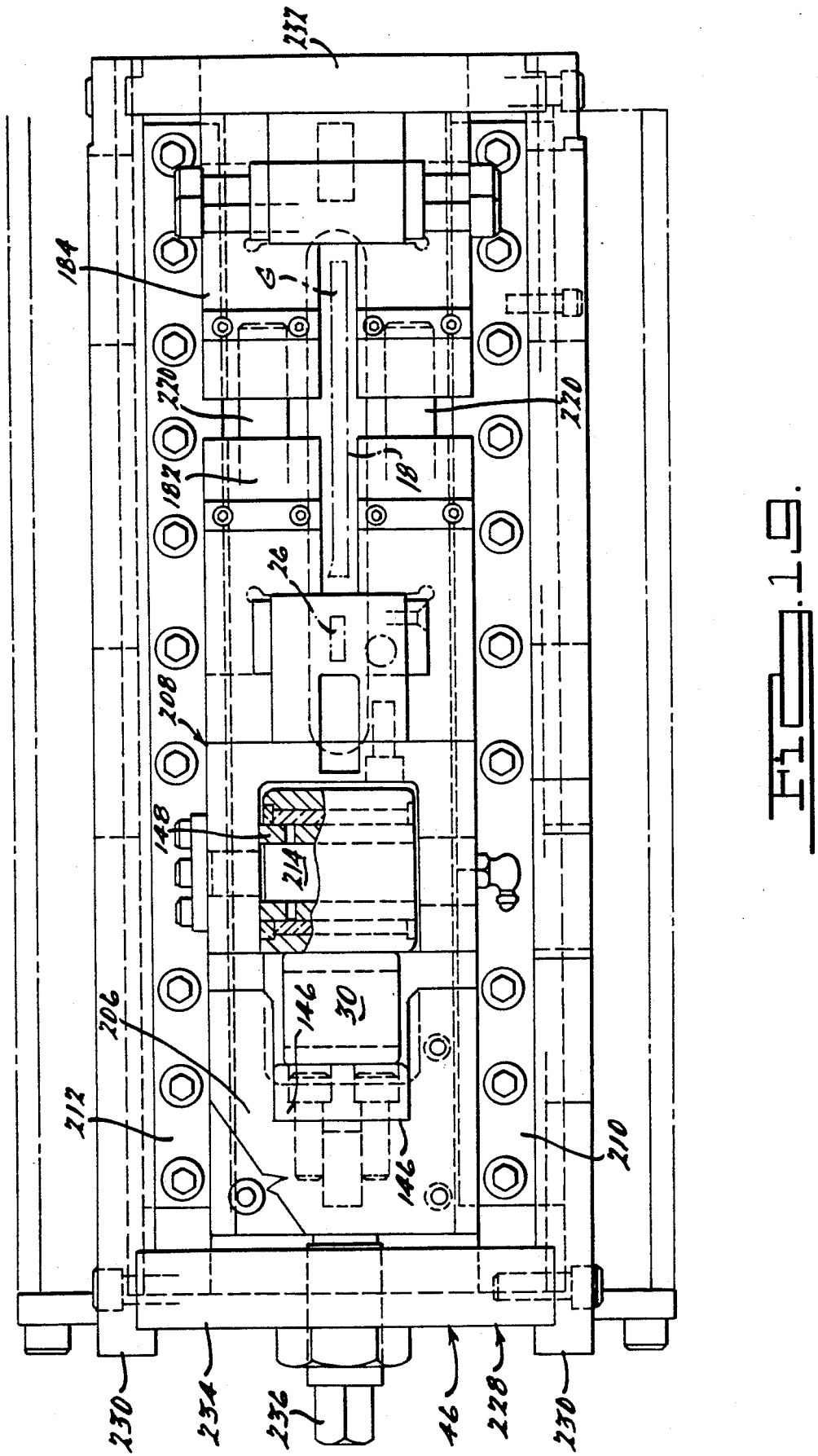
FIG. 19 is a top plan view, partially in section, of the cartridge shown in FIG. 17.

Jaw holders 182, 184 are separate pieces, each constrained to slide relative to the saddle. A "fixed" slide or jaw holder 182 is in abutting relation to the roller holder 208 and confronting relation to jaw holder 184 which is "adjustable." Fixed jaw holder is "fixed" in the sense that the distance between the load plate of cam driver 30 and its engagement to the cam roller and the center axis of the tube when engaged by the jaw member on the fixed holder, the tube axis and a vertical plane being shown by I in FIG. 17, is a constant fixed dimension. The jaw holders are interconnected by two heavy spring loaded plungers 220 retained in respective bores 222 and 224 disposed in each holder 182 and 184. The spring 226 normally biases the holders laterally apart such that jaws 22 are in the open position, not engaging a tube.

Two jaws 22 are mounted on each respective jaw holder. Each of the jaws have two complementary portions spaced along the tube T a distance to provide clearance for passage of the cut-off blade 18 and slotting blade 26 in a single severing plane therebetween.

Encircling the top of and slidably mounted to the saddle is a generally rectangular planar frame 228 including a pair of longitudinally extending tie bars 230, and a pair of laterally extending bars including a backup plate 232, adjacent the adjustable jaw holder 184 and a load bar 234 adjacent to cam follower holder 206 mounting wear plate 146. A preload adjusting screw 236 extends through the load bar to engage the wear plate holder with further movement of the screw toward (or away from) the wear plate holder causing the frame 238 to shift slightly relative to the carriage saddle 186, in a direction transverse to the direction of tube feed, causing the adjustable jaw holder 184 to move towards (or away from) the fixed jaw holder 182. This movement closes (opens) the jaw members 22. The distance between the cam driver surface, engaging the roller, and the tube feed center axis is a constant fixed dimension. If the load bar 234 moves, such as the left by an amount J shown in FIG. 20, so does the back up plate 232, by a like amount.

It is to be understood that because of the mounting arrangement, the cam driver 30 and the cartridge 46 can form a separately mountable kit which can be readily removed from an replaced by another kit, possibly preset with different jaw members.

Advantageously, the cartridge having an adjustment arrangement shown eliminates any need for a separate setup fixture to adjust the spacing of the cam followers 146, 148 relative to the jaw members because the base 186 is in fact a part of an adjustment fixture. The cartridge is always lined up with the tub centerline because the cam driver is fixed in the upper shoe and cam roller holder 208 plus jaw holder 182 are at a fixed dimension. Wear and shock loading are taken up at the same end of the frame 228 and does not interfere with the set dimension between the cam driver and the centerline of the tube. Because the blades 18 and 26 and cam driver 30 are in a fixed position relative to movement of the die shoes 12 and 14 the tube is always cut on the center of the nick. By having both pairs of holders separate, slidable and in confronting relation, costly machining is minimized such as in arrangement where one jaw holder would slide on and relative to the other jaw holder.

Presently, the art only allows low carbon steel tubes to be cut. Surprisingly the tube cut-off die set and replaceable cartridge arrangement in accordance with this invention has been found to cut tubes—such as hardened stainless steel, higher alloyed materials and high tensile strength steels—which the Riera apparatus either could not cut, or would produce dimples, or would break blades requiring change and/or replacement and jaw replacements. While not totally understood, the specific configuration of the apparatus, such as by the stiffening arrangement provided by the cooperative relation between the guide posts and associated tie bars and rail mounting plate, or the horizontal notching blade holder bearing being constrained at its opposite ends for horizontal sliding movement so that the notching blade is prevented from wobbling such as might be presented during pulling/pushing of a cantilevering cross slide, or the jaw members and cam followers being separately mounted and independently slidable reactive to a carriage such that the holders are less massive to move more responsively to the cam driver operation, unexpectedly provides superior results.

While the above description constitutes the preferred embodiment of the invention, it will be appreciated that the invention is susceptible to modification, variation, and change without departing from the proper scope or fair meaning of the accompanying claims.

What I claim is:

1. A tube cut-off machine for severing elongated material moving continuously longitudinally of its length, comprising
    a lower die shoe defining a horizontal plane,
    tube clamping means for releasably clamping said tube during the severing operation and including two jaw members,
    a cam follower operably connected to one jaw member,
    a ram assembly vertically reciprocable relative to said die shoe and including a tube severing blade and a cam, the improvement characterized in that
    said tube clamping means comprises a cartridge that is removably mounted as a unit to said die shoe, said cartridge comprising
    a base mounted to and stationary relative to said die shoe,
    bias means for laterally biasing the jaw members apart, and
    a frame slidably mounted on said base to hold said cam follower and jaw members in a predetermined side-by-side relation, said follower and jaw members being adapted to slide relative to said frame and said base in a direction transverse to the tube axis, operation of said ram assembly simultaneously causing said cam to engage the follower and drive the jaw members into clamping relation with the tube and the blade to be driven into the tube such that the tube is severed;
    further including a second cam follower, the respective cam followers and jaw members being confronting and each mounted on a holder slidably disposed relative to the frame, one and the other cam holder abutting, respectively, one short tie bar and one jaw holder and the other jaw holder abutting the other short tie bar, the cam followers engaging the cam driven therebetween, the adjustment means includes a threaded adjustment member threadably extending through said one short tie bar to drive the second cam holder towards the first cam holder when engaging the cam driver whereby the jaw holders and their jaw members move laterally toward or away from one another.

2. The tube cut-off machine as recited in claim 1 including retention means including said cam driver for retaining said cartridge on said die shoe.

3. The tube cut-off machine as recited in claim 2 further including a second cam follower and wherein said retention means comprises said first and second cam followers gripping the cam driver.

4. The tube cut-off machine as recited in claim 3 wherein the second cam follower comprises a replaceable wear plate including a pair of flat cam surfaces and said first cam follower comprises a rotatably mounted roller.

5. The tube cut-off machine as recited in claim 2 wherein said retention means further includes a retention strap connected to the lower die shoe which abuts the base.

6. A tube cut-off die set for use in a vertically reciprocating press, comprising, in combination,
    a lower die shoe,
    a vertically reciprocating upper die shoe, including a cam and a cut-off blade mounted for movement in a vertical direction,
    a first guide means for guiding reciprocation between the shoes, and
    tube holding means on said lower die shoe for releasably clamping said tube, the improvement characterized by
    said tube holding means comprising a unitary cartridge adapted to be removably mounted to said lower die shoe, said cartridge including spaced confronting jaw members, spaced confronting cam followers for receiving the cam each follower being mounted on a slidable follower holder, bias means for biasing the jaw members apart, a frame member and adjustment means operating against a cam holder for adjusting the clamping pressure of the tube holding means relative to the tube, said cam followers being operating on by said cam to drive the jaw members into clamping relation with said tube prior to cutting by the blade.

7. The tube cut-off die set as recited in claim 6, further including second guide means for guiding the cartridge into a predetermined position relative to said lower die shoe whereby the cut-off blade will pass through the jaw members.

8. The tube cut-off die set as recited in claim 6 including retention means for removably securing the cartridge relative to said lower die shoe.

9. The tube cut-off set as recited in claim 8 wherein said retention means comprises said cam being received between the cam followers to be reciprocated within said cartridge.

10. The tube cut-off die set as recited in claim 6 wherein one and the other cam follower are a tapered wear plate and a roller mounted for rotation.

11. The tube cut-off die set as recited in claim 6 wherein said cartridge includes a stationary base mounted to said lower die shoe, and a frame movably mounted on said base, said frame enclosing the jaw members and the cam followers, each slidable relative to one another within the frame and to the base.

12. The tube cut-off set as recited in claim 11 wherein said frame includes first and second bars engaging the outermost of cam follower and jaw member, and said adjustment means comprises a threaded shaft extending from one said bar with advance of the shaft moving the jaws toward or away form one another, whereby the lateral space between the jaw members is changed while the cartridge is mounted on the lower die shoe.

13. Apparatus for performing work on a tubular workpiece, including a base, a ram assembly including a cam vertically reciprocable relative to said base, and a tube severing blade operated by said assembly, the improvement characterized by a tube holding cartridge adapted to be placed in cartridge receiving means associates with said base and locked against movement by cartridge locking means, said cartridge including reciprocable first and second jaw members arranged to clamp against said tube, first and second cam followers adapted to be operated by said cam to drive said jaw members into and out of clamping engagement with said tube, said cam followers and jaw members mounted on respective holders slidably mounted directly to said base with said second cam follower abutting the first jaw member, one said follower being a tapered wear plate, and adjustment means acting against the first cam follower and second jaw member for changing the spacing between the jaw members when the cam followers are engaging said cam.

14. A tube holding apparatus including a tube feed mechanism, a cam driver compliant in its lateral width, and a tube severing blade, said apparatus comprising a base mountable relative to said die set, a pair of laterally spaced jaws, both slidable on the base with respect to one another, means for adjusting the spacing between the jaws, and closure means operated by said compliant cam driver for clamping about the tube, the closure means including a spring which biases the jaws apart, a pair of cam followers which define an opening for receiving the compliant driver, at least one cam following being a roller and operating on one jaw member, and frame means for captivating the jaw members and cam followers in side-by-side relation on said base, the frame means being operably associated with the other side cam follower and the other jaw member.

15. A tube holding apparatus including a tube feed mechanism, a compressible cam driver, and a tube severing blade, said apparatus comprising a base mountable relative to said die set, a pair of laterally spaced jaws, both slidable on the base with respect to one another, means for adjusting the spacing between the jaws, and closure means operated by said compressible cam driver for clamping about the tube, the closure means including a spring which biases the jaws apart, a pair of cam followers which define a lateral opening for receiving the compressible driver vertically reciprocated therebetween, at least one cam following being a wear pad including a flat surface and and operating on one said jaw member, and frame means for captivating the jaw members and cam followers in side-by-side relation on said base, the frame means being operably associated with the other side cam follower and the other jaw member.

16. A ram driver apparatus in which sections of tubing are successively severed from a continuous length thereof comprises a tube clamping mechanism including a pair of opposed complemental die jaws mounted on slides which are controlled by a cam follower, a passage partially defined by said cam follower and through which a driver cam may pass to drive the die jaws into engaging relations with the tube, said driver cam being characterized by a longitudinally extending member having an elongated way, a load bar disposed in and extending substantially the length of said way, and bias means acting on said load bar for biasing said load bar against said cam follower, unsymmetrical loading placed by said ram on said driver being compensated for by deflection of the load bar whereby to reduce undesired wear and overloading on the cam follower.

17. The ram driven apparatus as recited in claim 16 wherein said way is T-shaped, and said load bar includes a top and a bottom surface and a pair of lateral lips each engageable with a flange that forms said T-shaped way whereby to captivate said bar therewithin, said bias means limiting inward deflection of said load bar such that the top surface thereof is spaced outwardly of the driver cam.

18. The ram driver apparatus as recited in claim 17 wherein said bias means comprises an undulating leaf spring having between its opposite ends peaks and valleys which engage one and the other of said way and load bar.

19. The ram driven apparatus as recited in claim 16 wherein said bias means comprises a plurality of coil springs disposed in the space between the driver, spaced apart therealong to support the load bar.

20. The ram driven apparatus as recited in claim 16 wherein said bias means comprises a substantially continuous longitudinal pad of elastomeric material extending along the way and engaged by the bottom surface of said load bar.

21. A cam driver for tube clamping apparatus of the type having complemental die jaws and a cam follower adapted to be engaged by the driver to drive the die jaws into clamping relation with the tube, comprising an elongated shaft of generally rectangular cross section one surface of which having a cavity extending therealong, a load bar disposed in said cavity, means for retaining the bar in said cavity, and bias means acting between the cavity surface and load bar for biasing the load bar outwardly of the cavity, engagement of the load bar by the cam follower forcing the bar inwardly.

22. The cam driver as recited in claim 21 wherein said bias means is an elongated leaf spring having its opposite ends proximate respective opposite ends of the load bar, said leaf spring undulating between its ends so that the confronting surfaces of the load bar and cavity are engaged by a plurality of peaks formed by the leaf.

23. The cam driver as recited in claim 21 wherein said bias means is a pad of elastomeric material.

24. A kit for use in a vertically reciprocating press and clamping a tubular workpiece to be severed, the press including two relatively reciprocable die shoes and a cut-off blade fixed to and driven by one said die shoe, said kit comprising a saddle including laterally spaced first and second cam followers at least one being a roller mounted by a pin for rotation about an axis parallel to the axis of tube feed, and a cam driver engaged by said cam followers and having one end portion adapted to be connected to one die shoe, said saddle further including first and second jaw holders slidably mounted to the saddle in confronting relation each jaw holder having a jaw mounted thereto, bias means for biasing the holders apart, frame means for retaining the cam followers and jaw holders in side-by-side relations, and adjustment means acting in a direction transverse to said tube axis for changing the separation between the jaw holders, said adjustment means being separated from said pin and operably disconnected from said roller.

25. The kit as recited in claim 24 including a pair of separated cam holders each slidably mounted on said saddle, one and the other cam follower being mounted on one cam holder with the other cam follower comprising a wear plate having first and second generally planar surfaces.

26. A kit for use in a vertically reciprocating press and clamping a tubular workpiece to be severed, the press including two relatively reciprocable die shoes and a cut-off blade fixed to and driven by one side die shoe, said kit comprising a saddle including laterally spaced first and second cam followers at least one being a wear plate having a planar surface, and a cam driver engaged by said cam followers and having one end portion adapted to be connected to one die shoe, said saddle further including first and second jaw holders slidably mounted to the saddle in confronting relation each jaw holder having a jaw removably mounted thereto, bias means for biasing the holders apart, frame means for retaining the cam followers and jaw holders in side-by-side relation, and adjustment means for changing the separation between the jaw holders, operation of said adjustment means being separate from said cam followers.

27. Apparatus for performing work on a tubular workpiece, including a pair of die shoes vertically reciprocable relative to one another, a tube slotting blade horizontally reciprocable relative to said shoes and guide means including first and second ends affixed to one and the other said she for guiding vertical reciprocation of the shoes, said apparatus characterized in that said guide means includes a first, second and third guide post each extending axially and the axes of the posts defining a right triangular array, each said guide post comprising a guide bearing mounted for reciprocation within a guide bushing the bearing including a first end and the guide bushing including a second end and a forward end portion for receiving the bearing, the forward end portions being spaced vertically from said other shoe and extending towards said one shoe, a first tie bar rigidly joining the forward end portions of the first and second bushings, and a tie plate rigidly joining the forward end portions of the second and third bushings.

28. The apparatus as recited in claim 27 further including a fourth guide post extending axially, the axes of the guide posts defining a rectangular array, and a second tie bar rigidly joining the forward end portions of the fourth and first bushings.

29. The apparatus as recited in claim 28 further including tie means associated with the tube slotting blade for connecting the forward end portions of the third and fourth bushings.

30. A tube cut-off die set for use in a vertically reciprocating die press comprising in combination a movable upper die shoe, a stationary lower die shoe, a cut-off blade and a cam driver mounted on the upper shoe for movement in a vertical tube severing plane, tube holding means mounted on the lower shoe and operated by said cam driver for releasably clamping the tube, said tube holding means comprising a unitary cartridge having a saddle removably mounted on the lower shoe and including a pair of tube holding jaw members for releasably engaging the tube, each member mounted on a holder slidably mounted directly to the saddle, one holder being driven by a cam in response to the cam driver, a first, a second and a third axially extending guide post each having their like respective ends connected to one and the other said shoe for guiding relative reciprocation therebetween such that the guide post axes define a right triangular array, means coupling the forward end portions of the first and the second, and the second and the third guide posts together for stiffening the frame formed by the array of guide posts, a rail mounting plate rigidly mounted on the lower die shoe, a slotting blade for notching the upper wall of the tube, a slotting blade bearing member carrying a first cam roller and the slotting blade holder, said bearing member being supported to the mounting plate for horizontal sliding movement relative to the lower shoe, a drive link pivotally mounted at its lower end to the lower shoe for movement in a plane parallel to the severing plane, the link carrying a second cam roller and having a cap member abutting said first cam roller, and a cam driver plate extending vertically downward from the upper shoe and having a cam slot receiving the second cam follower, vertical reciprocation of said driver plate causing said second cam follower to pivot said link pin whereby the cap member drives the first cam follower in a horizontal path, causing the driver to cam the jaws about the tube and notching blade to traverse and notch the tube.

31. The tube cut-off die set as recited in claim 30 including a forth guide post, the guide post axes defining a rectangular array with the first and second and third and fourth axes defining vertical axes parallel to the tube axis, and a tie bar secures the forward end portions of the fourth and first guide posts.

32. The tube cut-off die set as recited in claim 30 wherein said stiffening means comprises said mounting plate being affixed to said second and third guide posts.

33. The tube cut-off die set as recited in claim 30 including interengaging bearings and horizontally extending guide rails on said mounting plate and slotting blade holder bearing member, the blade holder being supported for horizontal sliding movement at a fixed vertical distance from the lower die shoe.

34. The tube cut-off die set as recited in claim 33 wherein said slotting blade holder has opposite end portions, and including constraint means proximate the end portions for constraining the blade holder to vertical movement relative to the blade holder bearing member, and releasable retention means for releasably clamping the respective end portions of the blade holder and constraining the notching blade for horizontal movement relative to the blade holder bearing member, said notching blade being rigidly supported between the retained end portions of said blade holder.

35. The tube cut-off die set as recited in claim 34 wherein said releasable retention means includes adjustment means for adjusting the vertical position of said blade holder bearing member relative to said lower die shoe.

36. The tube cut-off die shoe as recited in claim 35 wherein one and the other end portion of said blade holder comprises a vertically extending arm adapted to be rigidly clamped by a releasable plate bolted to the bearing member and a T-shaped section captivated for sliding movement within a vertical way formed in the bearing member, and said adjustment means includes a stationary bearing housing secured to said bearing member, an elongated threaded shaft having one end portion rotatably journalled to the housing and a forward end portion in threadable engagement with the blade holder, rotation of the shaft causing the blade holder to advance vertically.

37. The tube cut-off die set as recited in claim 36 wherein said notching blade is disposed at acute angle relative to a vertical and includes a thickened end portion mounted to the blade and a forward end portion from its rearward portion for notching the tube wall, the end portions being in laterally offset parallel vertical planes.

38. The tube cut-off die set as recited in claim 37 wherein the releasable plate is proximate to the notching forward end portion of the blade.

39. A tube cut-off die set for use in a vertically reciprocating die press comprising in combination a movable upper die shoe, a stationary lower die shoe, a cut-off blade and a cam driver mounted on the upper shoe for movement in a vertical tube severing plane, tube holding means mounted on the lower shoe and operated by said cam driver for releasably clamping the tube, said tube holding means comprising a unitary cartridge having a saddle removably mounted on the lower shoe and including a pair of tube holding jaw members for releasably engaging the tube, each member mounted on a holder slidably mounted directly to the saddle, one holder being driven by a cam in response to the cam driver, a first, second and third axially extending guide post each having their like respective ends connected to one and the other said shoe for guiding relative reciprocation therebetween such that the guide post axes define a right triangular array, a rail mounting plate rigidly mounted on the lower die shoe, a slotting blade for notching the upper wall of the tube, a slotting blade bearing member carrying a first cam roller and the slotting blade holder, said bearing member being supported to the mounting plate for horizontal sliding movement relative to the lower shoe, a drive link pivotally mounted at its lower end to the lower shoe for movement in a plane parallel to the severing plane, the link carrying a second cam roller and having a cap member abutting said first cam roller, and a cam driver plate extending vertically downward from the upper shoe and having a cam slot receiving the second cam follower, vertical reciprocation of said driver plate causing said second cam follower to pivot said link pin whereby the cap member drives the first cam follower in a horizontal path, causing the driver to cam the jaws about the tube and notching blade to traverse and notch the tube, wherein said clam driver comprises a compliant beam including a longitudinally extending cavity on opposite faces thereof, each cavity retaining a load bar extending the length of the cavity and bias means for biasing the bar outwardly.

40. The tube cut-off die set as recited in claim 39 wherein said tube holding means comprises a pair of laterally spaced cams which define a vertical passage therebetween to receive and engage the respective load bars when the cam driver is driven downwardly therebetween, one cam being a wear plate having a flat tapered surface to engage the forward end of the cam driver.

41. The tube cut-off die set as recited in claim 39 wherein said tube holding means comprises a pair of laterally spaced cams which define a vertical passage therebetween to receive and engage the respective load bars when the cam driver is driven downwardly therebetween, one cam being a roller.

* * * * *

UNITED STATES PATENT AND TRADEMARK OFFICE
CERTIFICATE OF CORRECTION

PATENT NO. : 5,016,507

DATED : May 21, 1991

INVENTOR(S) : John F. Riera, Billy J. Bielawski, Sr., and John J. Pavelec

It is certified that error appears in the above-identified patent and that said Letters Patent is hereby corrected as shown below:

Abstract, line 12, "blades" should be --blade--.

Column 2, line 45, "mans" should be --means--.

Column 2, line 47, "by" should be --but--.

Column 3, line 30, "bashing" should be --bushing--.

Column 5, line 32, "being" should be --bearing--.

Column 5, line 38, "horizontally" should be --horizontal--.

Column 6, line 24, "driver" should be --drive--.

Column 7, line 1, "determined" should be --determines--.

Column 7, line 42, "am" should be --cam--.

Column 8, line 8, after "cushioned", insert --by--.

Column 8, line 38, "plan" should be --plane--.

Column 8, line 59, "68" should be --58--.

Column 9, line 29, "retains" should be --retainers--.

UNITED STATES PATENT AND TRADEMARK OFFICE
CERTIFICATE OF CORRECTION

PATENT NO. : 5,016,507

DATED : May 21, 1991

INVENTOR(S) : John F. Riera, Billy J. Bielawski, Sr., and John J. Pavelec

It is certified that error appears in the above-identified patent and that said Letters Patent is hereby corrected as shown below:

Column 9, line 35, "183" should be --138--.

Column 9, line 45, "gip" should be --gib--.

Column 10, line 32, after "as", insert --to--.

Column 10, line 38, "an" should be --and--.

Column 10, line 45, "tub" should be --tube--.

Column 11, line 10, "reactive" should be --relative--.

Column 12, line 33, claim 6, "operating" should be --operated--.

Column 12, line 57, claim 12, after "cut-off", insert --die--.

Column 12, line 62, claim 12, "form" should be --from--.

Column 13, line 2 & 3, claim 13, "associates" should be -associated--.

Column 13, line 27, claim 14, "following" should be --follower--.

Column 13, line 44, claim 15, "following" should be --follower--.

Column 13, line 45, claim 15, delete "and" (second occurrence).

UNITED STATES PATENT AND TRADEMARK OFFICE
CERTIFICATE OF CORRECTION

PATENT NO. : 5,016,507

DATED : May 21, 1991

INVENTOR(S) : John F. Riera, Billy J. Bielawski, Sr., and John J. Pavelec

It is certified that error appears in the above-identified patent and that said Letters Patent is hereby corrected as shown below:

Column 13, line 51, claim 16, "driver" should be --driven--.

Column 13, line 58, claim 16, "relations" should be --relation--.

Column 14, line 7, claim 18, "driver" should be --driven--.

Column 14, line 7, claim 18, "17" should be --16--.

Column 14, 54&55 claim 24, "relations" should be --relation--.

Column 15, line 21, claim 27, "she" should be --shoe--.

Signed and Sealed this

Twenty-fourth Day of August, 1993

*Attest:*

BRUCE LEHMAN

*Attesting Officer*     *Commissioner of Patents and Trademarks*